US009900517B2

(12) United States Patent
Hansen et al.

(10) Patent No.: US 9,900,517 B2
(45) Date of Patent: Feb. 20, 2018

(54) INFRARED BINOCULAR SYSTEM WITH DUAL DIOPTER ADJUSTMENT

(71) Applicant: FLIR Systems, Inc., Wilsonville, OR (US)

(72) Inventors: Joel A. Hansen, Beaverton, OR (US); John L. Miller, Lake Oswego, OR (US); Milton Stuart Worley, Lake Oswego, OR (US); Noel Jolivet, Lake Oswego, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 14/819,172

(22) Filed: Aug. 5, 2015

(65) Prior Publication Data
US 2016/0037077 A1 Feb. 4, 2016

Related U.S. Application Data

(63) Continuation of application No. 13/023,424, filed on Feb. 8, 2011, now abandoned.
(Continued)

(51) Int. Cl.
| H04N 5/33 | (2006.01) |
| G09G 5/00 | (2006.01) |
| G03B 41/00 | (2006.01) |
| H04N 5/232 | (2006.01) |
| H04N 5/225 | (2006.01) |
| H04N 5/272 | (2006.01) |
| G06K 9/62 | (2006.01) |
| G06T 11/00 | (2006.01) |
| G06T 11/60 | (2006.01) |

(Continued)

(52) U.S. Cl.
CPC ........ *H04N 5/23293* (2013.01); *G02B 23/10* (2013.01); *G02B 23/12* (2013.01); *G02B 23/18* (2013.01); *G06K 9/6201* (2013.01); *G06T 11/001* (2013.01); *G06T 11/60* (2013.01); *H04N 5/2252* (2013.01); *H04N 5/2254* (2013.01); *H04N 5/2258* (2013.01); *H04N 5/232* (2013.01); *H04N 5/23212* (2013.01); *H04N 5/23296* (2013.01); *H04N 5/272* (2013.01); *H04N 5/33* (2013.01)

(58) Field of Classification Search
CPC ............................... G03B 41/00; H04N 13/04
USPC ...................................... 348/51, 53, 122, 164
See application file for complete search history.

(56) References Cited

U.S. PATENT DOCUMENTS

| 4,188,097 A * | 2/1980 | Holladay ................. | A61B 3/08 |
| | | | 351/222 |
| 4,886,347 A * | 12/1989 | Monroe .................... | G01C 3/04 |
| | | | 356/12 |

(Continued)

*Primary Examiner* — Behrooz Senfi
*Assistant Examiner* — Maryam Nasri
(74) *Attorney, Agent, or Firm* — Haynes and Boone, LLP

(57) ABSTRACT

Binocular system, including method and apparatus, for viewing a scene. The system may comprise a left camera and a right camera that create left and right video signals from detected optical radiation. At least one of the cameras may include a sensor that is sensitive to infrared radiation. The system also may comprise a left display and a right display arranged to be viewed by a pair of eyes. The left and right displays may be configured to present respective left video images and right video images formed with visible light based respectively on the left and right video signals.

20 Claims, 9 Drawing Sheets

Related U.S. Application Data

(60) Provisional application No. 61/406,059, filed on Oct. 22, 2010, provisional application No. 61/433,370, filed on Jan. 17, 2011.

(51) Int. Cl.
  *G02B 23/10* (2006.01)
  *G02B 23/12* (2006.01)
  *G02B 23/18* (2006.01)

(56) References Cited

U.S. PATENT DOCUMENTS

| | | | | |
|---|---|---|---|---|
| 6,115,025 A * | 9/2000 | Buxton | | G06F 1/1601 345/166 |
| 6,201,641 B1 * | 3/2001 | Filipovich | | G02B 23/12 2/447 |
| 6,301,370 B1 * | 10/2001 | Steffens | | G06K 9/00228 342/90 |
| 2002/0141075 A1 * | 10/2002 | Nagae | | G02B 7/102 359/699 |
| 2003/0121897 A1 * | 7/2003 | Patton | | A44C 17/00 219/121.69 |
| 2005/0128584 A1 * | 6/2005 | Shulman | | H04N 13/0438 359/462 |
| 2006/0279205 A1 * | 12/2006 | Li | | H01L 27/3267 313/506 |
| 2006/0291849 A1 * | 12/2006 | Shamir | | G03B 7/08 396/334 |
| 2007/0235634 A1 * | 10/2007 | Ottney | | G01J 5/02 250/214 VT |
| 2007/0268576 A1 * | 11/2007 | Lee | | G02B 23/18 359/407 |
| 2008/0266656 A1 * | 10/2008 | Sander | | G02B 21/0012 359/372 |
| 2011/0102558 A1 * | 5/2011 | Moliton | | H04N 13/0022 348/54 |
| 2013/0113894 A1 * | 5/2013 | Mirlay | | G03B 35/08 348/47 |

* cited by examiner

INFRARED BINOCULAR SYSTEM WITH DUAL DIOPTER ADJUSTMENT

CROSS-REFERENCES TO PRIORITY APPLICATIONS

This application is a continuation of U.S. patent application Ser. No. 13/023,424, filed Feb. 8, 2011, which in turn is based upon and claims the benefit under 35 U.S.C. § 119(e) of U.S. Provisional Patent Application Ser. No. 61/406,059, filed Oct. 22, 2010, and U.S. Provisional Patent Application Ser. No. 61/433,370, filed Jan. 17, 2011. Each of these priority applications is incorporated herein by reference in its entirety for all purposes.

INTRODUCTION

Various optical devices are available for providing magnified views of distant objects or scenes. These devices may be distinguished by whether they are based on lenses, mirrors, or both, by whether they have one eyepiece or two, by whether they are handheld or mounted, and so on. Common handheld devices include monoculars, bioculars, and binoculars. Monoculars have one imager and one eyepiece. A user who uses this device may see an altered (e.g., magnified) view of the scene in one eye and an unaided view of the scene in the other eye. Bioculars have one imager and two eyepieces. Here, the user's two eyes see the same two-dimensional (2D) altered image of the scene, with no depth or relief cues provided by binocular disparity. Binoculars have two imagers and two eyepieces. Unlike bioculars, binoculars can create two separate image-altered views of the world from two horizontally separated viewpoints. The difference between these viewpoints can result in binocular disparity between the left eye and the right eye retinal images, which may, for those with normal binocular vision, provide cues for stereoscopic depth perception of the scene or a three-dimensional (3D) image.

Most handheld optical devices are intended for daytime use. However, recently, devices have been developed for nighttime use. Such night vision systems may be based on image intensification (light amplification) or thermal (infrared (IR) radiation) imaging. Most consumer night vision products are light amplifying devices, because light amplification is less expensive than imaging IR radiation. Light amplification technology is dependent on at least a small amount of ambient light, such as moonlight or starlight, reflected off objects to provide an amplified image. Infrared radiation, in contrast to ambient light, may be emitted by an object, rather than (or in addition to) reflected off of it. Infrared radiation is a type of electromagnetic radiation having wavelengths longer than those of visible light but shorter than those of radio waves. Infrared radiation is emitted from all objects as a function of their temperature (as in the phenomenon of "blackbody radiation"). Hotter, and therefore more energetic, objects give off more infrared radiation at higher frequency and shorter wavelength than do cooler objects, because higher frequencies and shorter wavelengths correspond to higher energies. Thus, objects such as humans or animals may be visualized and distinguished using IR imaging, in some case even in total darkness where no ambient light is present.

Examples of optical devices are disclosed in U.S. Pat. No. 7,098,458 and U.S. Patent Application Publication No. 2001/0045978, the disclosures of which are incorporated herein by reference in their entireties for all purposes.

SUMMARY

The present disclosure is directed to a binocular system, including method and apparatus, for viewing a scene. The system may comprise a left camera and a right camera that create left and right video signals from detected optical radiation. At least one of the cameras may include a sensor that is sensitive to infrared radiation. The system also may comprise a left display and a right display arranged to be viewed by a pair of eyes. The left and right displays may be configured to present respective left video images and right video images formed with visible light based respectively on the left and right video signals.

DEFINITIONS

Figure 1:
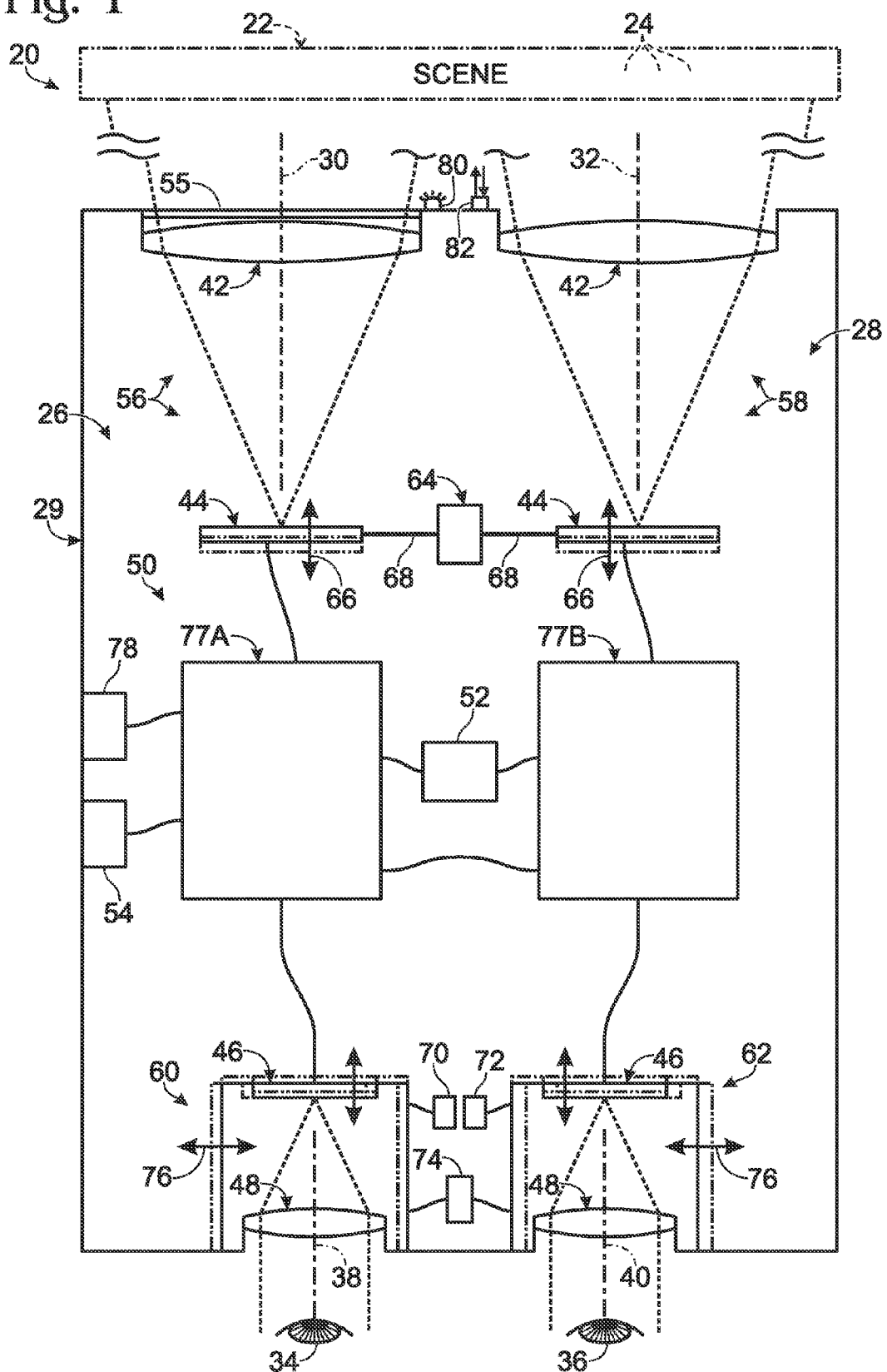
FIG. 1 is a schematic view of selected aspects of an exemplary binocular system, in accordance with aspects of the present disclosure.

Technical terms used in this disclosure have the meanings that are commonly recognized by those skilled in the art. However, the following terms may have additional meanings, as described below. The wavelength ranges identified in these meanings are exemplary, not limiting, and may overlap slightly, depending on source or context. The wavelength ranges lying between about 1 nm and about 1 mm, which include ultraviolet, visible, and infrared radiation, and which are bracketed by x-ray radiation and microwave radiation, may collectively be termed optical radiation.

Ultraviolet Radiation. Electromagnetic radiation invisible to the human eye and having wavelengths from about 100 nm, just longer than x-ray radiation, to about 400 nm, just shorter than violet light in the visible spectrum. Ultraviolet radiation includes (A) UV-C (from about 100 nm to about 280 or 290 nm), (B) UV-B (from about 280 or 290 nm to about 315 or 320 nm), and (C) UV-A (from about 315 or 320 nm to about 400 nm).

Visible Light. Electromagnetic radiation visible to the normal human eye and having wavelengths from about 360 or 400 nanometers, just longer than ultraviolet radiation, to about 760 or 800 nanometers, just shorter than infrared radiation. Visible light typically may be imaged and detected by the unaided human eye and includes violet (about 390-425 nm), indigo (about 425-445 nm), blue (about 445-500 nm), green (about 500-575 nm), yellow (about 575-585 nm), orange (about 585-620 nm), and red (about 620-740 nm) light, among others.

Infrared (IR) Radiation. Electromagnetic radiation invisible to the human eye and having wavelengths from about 700 or 800 nanometers, just longer than red light in the visible spectrum, to about 1 millimeter, just shorter than microwave radiation. Infrared radiation includes (A) IR-A (from about 700 nm to about 1,400 nm), (B) IR-B (from about 1,400 nm to about 3,000 nm), and (C) IR-C (from about 3,000 nm to about 1 mm). IR radiation, particularly IR-C, may be caused or produced by heat and may be emitted by an object in proportion to its temperature and emissivity. Portions of the infrared having wavelengths between about 3,000 and 5,000 nm (i.e., between about 3 and 5 µm) and between about 8,000 and 12,000 nm (i.e., between about 8 and 12 µm) may be especially useful in thermal imaging, because they correspond to minima in atmospheric absorption and thus are more easily detected (particularly at a distance). The particular interest in relatively shorter wavelength IR has led to the following classifications: (A) near infrared (NIR) (from about 780 nm to about 1,000 nm (1 µm)), (B) short-wave infrared (SWIR) (from about 1,000 nm (1 µm) to about 3,000 nm (3 µm)), (C) mid-wave infrared (MWIR) (from about 3,000 nm (3 µm) to about 8,000 nm (8 µm), or about 3 µm to 5 µm), (D) long-wave infrared (LWIR) (from about 8,000 nm (8 µm) to about 15,000 nm (15 µm) or about 8 µm to 12 µm), and (E) very long-wave infrared (VLWIR) or far infrared (FIR) (from about 15,000 nm (15 µm) to about 1 mm). Portions of the infrared, particularly portions in the far or thermal IR having wavelengths between about 0.1 and 1 mm, may alternatively, or in addition, be termed millimeter-wave (MMV) wavelengths.

Camera. An image sensor alone or in combination with input optics that transmit incident radiation to the sensor. A camera may be described according to the wavelength band that is detected, as determined by a combination of the spectral sensitivity of the sensor and the spectral selectivity, if any, of the input optics. Each camera may, for example, be a visible light camera that predominantly or exclusively detects visible light, an ultraviolet camera that predominantly or exclusively detects ultraviolet radiation, or an infrared camera that predominantly or exclusively detects infrared radiation. If an infrared camera, the camera may be a short-wave infrared camera that predominantly or exclusively detects SWIR, a mid-wave infrared camera that predominantly or exclusively detects MWIR, a long-wave infrared camera that predominantly or exclusively detects LWIR, or a combination thereof (e.g., an MWIR/LWIR camera), among others.

DETAILED DESCRIPTION

The present disclosure is directed to a binocular system, including method and apparatus, for viewing a scene. The system may comprise a left camera and a right camera that create left and right video signals from detected optical radiation received from about a same field of view along respective left and right optical axes that are parallel to and offset from each other. At least one of the cameras may include a sensor that is sensitive to infrared radiation. The system also may comprise a left display and a right display arranged to be viewed by a pair of eyes and configured to present left and right video images formed with visible light, based respectively on the left and right video signals. In some embodiments, the left camera and the right camera may detect, or be configured to detect, respective wavelength bands (of optical radiation) that are different from each other. In some embodiments, the displays also may be configured to present other information, such as alphanumeric characters and/or other symbols, with one of the displays as both displays present video images, such that the other information is only seen with one eye when the video images are viewed by a pair of eyes.

The present disclosure relates to a binocular system that may use the human visual system (HVS) to compute depth perception. Specifically, aspects of the disclosure relate to an infrared binocular system including two infrared cameras to create left and right video signals (or streams) that are communicated (with or without manipulation by a controller) to separate visualization units, such as units including miniature displays. The displays present left and right video images separately to left and right eyes of a user based on the corresponding video signals. The HVS of the user may reconstruct the video images into a real time 3D video with depth perception. The system may allow distance to objects and object relative locations to be determined by the observer in a passive manner, without the use of laser rangefinders.

The binocular system may present left and right video images to a user in real time, generally with no perceptible delay between creation of video signals by the cameras and presentation of corresponding video images by the displays. Use of the human visual system to blend and/or compare left and right video images generally can be performed much more rapidly than with an onboard computer. Accordingly, the system disclosed herein may rely on the user's brain to integrate and/or contrast, in real time, left and right video images collected by corresponding cameras that detect different wavelengths of optical radiation. Integration of these video images by the user's visual system may provide depth cues for a scene, and comparison of the video images may identify objects/features of interest in the scene. For example, in some cases, regions of the scene that appear most similar at the different wavelengths may be integrated more easily by the user's visual system to provide context information and/or depth cues. In contrast, objects/features of interest in the scene that appear more distinct from each other at the different wavelengths may stand out because they are more difficult for the visual system to integrate. Alternatively, the left and right video images may be configured (e.g., by using an inverse polarity and/or different palettes for the two sets of video images) such that objects/features of interest are relatively more easily integrated by the user's human visual system than the rest of the scene.

Further aspects of binocular systems are disclosed in the following sections, including (I) overview of an exemplary binocular system, (II) controller capabilities, and (III) examples.

I. Overview of an Exemplary Binocular System

FIG. 1 is a schematic view of selected aspects of an exemplary multi-channel imaging system or binocular system 20 for viewing a scene 22 composed of distant objects 24. The binocular system may be described as electronic binoculars that comprise at least two side-by-side monocular assemblies (or telescopes) 26, 28. Each monocular assembly may be capable of detecting incident optical radiation, to create a representative video signal (i.e., image data representing a sequence of detected images). The video signal may (or may not) be manipulated, generally electronically, before being converted back into optical radiation, to produce visible light images corresponding to the incident optical radiation. In contrast to strictly optical binoculars, input and output optical paths of the system do not need to connect to one another. Furthermore, in some cases, the input and output optical paths may be defined by respective, separate units that are movable independently of one another and/or that are remote from one another.

Monocular assemblies 26, 28 may be supported and enclosed by a support assembly 29 (also termed a frame, housing, or body), which may hold the assemblies on respective input optical axes 30, 32 that are parallel to and offset (i.e., spaced) from one another. Assemblies 26, 28 may be arranged to be used by a pair of eyes 34, 36 of a person at the same time, with the eyes positioned on output optical axes 38, 40 for separate viewing of left video images and right video images.

Exemplary functional and structural relationships among components of system 20 are shown schematically in FIG. 1. Electrical and/or signal communication between components is represented schematically by curved lines. Each site of communication may be via a wired or wireless connection. Mechanical connections are represented schematically by straight lines, and, optionally, may be replaced or augmented by electrical communication. Exemplary permitted motions of selected system components, to adjust the position of the selected components relative to support assembly 29, are indicated by double-headed motion arrows and by phantom representations of the selected components. Exemplary light rays entering, exiting, and traveling within the system are presented schematically as dashed lines of uniform dash length. These exemplary light rays are intended to draw attention to portions of the system involved in detecting and displaying images and not to portray the exact pathways followed by the light (which will depend on particulars of the optics).

Each monocular assembly 26, 28 may include (A) input optics 42 (such as an objective) for gathering, directing, filtering, and/or focusing radiation, such as infrared radiation, incident along one of input optical axes 30, 32, (B) a sensor 44 (also termed an image sensor) for detecting images formed by the input optics on the sensor and converting the images into a representative video signal, (C) a display 46 for converting the video signal into video images formed with visible light, and (D) output optics 48 (also termed an eyepiece) that a user may utilize to see the video images. The monocular assembly and/or system 20 also may include a controller 50 to manipulate the video signal before it is communicated to the display, and to control operation of, receive inputs from, and/or otherwise communicate with components of the monocular assembly and/or binocular system, such as controlling presentation of images by the displays based on the signals. The monocular assembly, system 20, or a camera unit or presentation unit thereof (see Section III), further may include at least one power supply 52 to power system components and at least one user interface 54 to communicate user inputs to controller 50, power supply 52, and/or other mechanisms of the system.

Each sensor 44 and its associated input optics 42 may be described as a camera or a collector (56 or 58).

Input optics 42 may be composed of one or more optical elements that transmit incident radiation to sensor 44. An optical element is any structure or device that collects, directs, and/or focuses optical radiation and/or selectively blocks undesired radiation. An optical element may function by any suitable mechanism, such as refracting, reflecting, diffracting, and/or filtering, among others, optical radiation. Exemplary optical elements include lenses, mirrors, gratings, prisms, filters, beam splitters, transmissive fibers (fiber optics), or the like. The input optics may define an optical path traveled by incident radiation to the sensor. Also, the input optics may form an optical window through which optical radiation is received by a monocular assembly and/or camera. In exemplary embodiments, the input optics may include a multispectral objective capable of gathering and focusing radiation of various wavelengths, for example, multiple infrared wavelengths (any combination of near-IR, SWIR, MWIR, and LWIR), infrared and visible wavelengths, ultraviolet and visible wavelengths, or ultraviolet, visible, and infrared wavelengths, among others.

The input optics may include one or more coatings (e.g., to reduce glare and/or reflections and/or for protection), at least one filter 55 (e.g., to block undesired radiation), and/or the like. The coatings may include a hard coating, such as diamond or diamond-like carbon, on an exterior surface region of each objective lens to improve durability. The filter may be a wavelength filter, an intensity filter, a polarizing filter, a safety filter to block light from a laser (such as a laser weapon), or the like. Exemplary wavelength filters include a band-pass filter, a high or low cut-off filter, a notch filter, or any combination thereof, among others. The filter may block only part of a spectral range, such as blocking only part of the spectral range of infrared radiation, only part of the LWIR range (an LWIR filter), only part of the MWIR range (an MWIR filter), only part of the SWIR range (an SWIR filter), only part of the visible range (a visible light filter), and so on. The filter may be disposed or disposable on the optical path that incident radiation travels to the sensor, and thus is interposed or interposable between an observed scene and the sensor.

The filter may be integral to the system or may be attached removably, such as to an exterior and/or an objective end of a monocular assembly, to incorporate the filter into a camera. In some cases, the filter may be connectable over an objective (i.e., between the objective and the scene) to enhance viewing. In other cases, the filter may be disposed (permanently or removably) in the optical path within the objective or between the objective and the sensor. Exemplary approaches for connecting the filter include threaded engagement, snap-on, a friction or interference fit, fasteners (such as screws or pins), or the like. The filter(s) may be easily removable or interchangeable to facilitate ready reconfiguration of the system for different uses and/or users.

One or both cameras 56, 58 optionally may be equipped with a filter, such as a wavelength filter and/or a polarizing filter, among others. If both cameras include a wavelength filter, the wavelength filters for the cameras may selectively block the same or different wavelength ranges of optical radiation. For example, the cameras may use respective filters that filter distinct types of optical radiation, such as an infrared filter that blocks a portion of the infrared spectrum for one camera and a visible filter that blocks a portion of the visible spectrum for the other camera. Alternatively, both cameras may use wavelength filters that each block different wavelength ranges of infrared radiation, different wavelength ranges of visible light, or different wavelength ranges of ultraviolet radiation. For example, the cameras may include respective filters that selectively block different wavelengths ranges of LWIR, MWIR, SWIR, MWIR+LWIR, SWIR+MWIR, or the like.

Sensor 44 may include any mechanism capable of detecting radiation of interest, for example, in the form of an image formed by the input optics, and converting the detected radiation into a signal representative of the detected radiation or image. The sensor may create a video signal by detecting a series of images over time, such as at a constant rate of image detection. The sensor generally includes a two-dimensional array of photosensitive elements or pixels. The sensor may, for example, include a cooled or uncooled infrared sensor (such as a focal plane array or microbolometer), a visible light sensor (such as a CCD or CMOS device), or the like. The sensors of assemblies 26, 28 may be set or adapted to detect the same type of optical radiation and/or the same wavelength bands (spectral ranges) of that type of optical radiation (e.g., among others, two ultraviolet sensors, one for each eye, two visible light sensors, one for each eye, two infrared sensors (each detecting SWIR, MWIR, and/or LWIR), one for each eye. Alternatively, the sensors may be set or adapted to detect different wavelength bands (e.g., among others, an SWIR sensor and an LWIR sensor, an SWIR sensor and an MWIR sensor, an MWIR sensor and an LWIR sensor, a visible light sensor and an infrared (SWIR, MWIR, and/or LWIR) sensor, an ultraviolet sensor and a visible light sensor, an ultraviolet sensor and an infrared sensor, and so on. One or more of the sensors also may simultaneously detect multiple wavelength bands (e.g., among others, SWIR and LWIR, MWIR and LWIR, or one or more infrared bands and visible). Multispectral sensors may allow greater flexibility, especially if used in conjunction with exchangeable filters, so that the binoculars can be configured and reconfigured for different uses. Some embodiments may include a third (or higher number) sensor of any waveband, including ultraviolet, visible, or infrared to provide additional cues. The third or high order sensor may share an input optical axis with the first or second sensor, or may have an input optical axis that is distinct, such as parallel and offset horizontally and/or vertically from the other input optical axes. The sensors may be independent or coordinated.

Cameras 56, 58 each may be configured to detect radiation from a similar field of view. Images detected by the left and right cameras may be of similar size, shape, and/or magnification. Accordingly, in some cases, images or video collected over the same time period by left and right cameras may represent pairs of left and right stereoscopic images and/or left and right videos that are stereoscopic.

Cameras 56, 58 may be configured to detect any suitable types and wavelength ranges of optical radiation, such as the same or different types and/or ranges. For example, left and right (or right and left) cameras respectively may be an ultraviolet camera and a visible light camera, an ultraviolet camera and an infrared camera, a visible light camera and an infrared camera, a pair of ultraviolet cameras, a pair of visible light cameras, or a pair of infrared cameras, among others. If a pair of infrared cameras, the cameras may, for example, be a pair of SWIR cameras, a pair of MWIR cameras, a pair of LWIR cameras, an SWIR camera and an MWIR and/or LWIR camera, an MWIR camera and an LWIR camera, and so on.

Display 46 may include any mechanism capable of converting the signal formed by the sensor, including a manipulated version of the signal formed by controller 50, into visible light images, capable of being detected by the human eye. Exemplary displays include liquid crystal displays (LCDs), light-emitting diode (LED) displays, organic light-emitting diode (OLED) displays, cathode ray tube (CRT) displays, phosphor displays, and so on. The display may be described as an electronic display. The display may be capable of generating grayscale (or monochromatic) images, color images, or a combination thereof.

The displays for the monocular assemblies may be synchronized or unsynchronized with each other. For example, the displays of system 20 may or may not be refreshed at the same rate, such as in unison or in alternation. The displays may be of similar size and shape and may be located at about the same distance from corresponding output optics 48, which may facilitate visualization of stereoscopic images or videos that can be utilized by the human visual system to perceive depth in the images/videos.

One or both of the displays may be operatively connected to at least one user-controlled intensity adjustment mechanism. The adjustment mechanism may be operated by a user, generally via user inputs communicated to one or both displays through user interface 54, to alter the relative intensity (i.e., the intensity ratio) of left video images compared to right video images presented by the two displays. Changing the intensity ratio of video images presented by the two displays may, for example, facilitate or improve integration of left video images with right video images by the user's human visual system. The relative intensity of the displays may be adjusted by changing the intensity of only one of the displays or by changing the intensities of both displays in opposite directions (i.e., making one of the displays brighter and the other of the displays less bright). The intensity of video images presented by one of the displays may (or may not) be adjustable by a user independently of the intensity of video images presented by the other display. In some cases, the intensity of each display may be adjustable independently of the intensity of the other display. Independently adjustable intensities may be particularly useful in embodiments in which the two monoculars are used to image different wavebands.

The left and right displays may be configured to present respective left video images and right video images. The left video images may be presented based on the left video signal, and the right video images may be presented based on the right video signal. Accordingly, the left video images correspond to the left input optical axis of the left camera and the right video images correspond to the right input optical axis of the right camera. In exemplary embodiments, there is no substantial blending of the left video signals with right video signal by the system: the right video signal makes no substantial contribution to the left video images and the left video signal makes no substantial contribution to the right video images. Instead, integration and/or comparison of left and right video images may be performed by the human visual system.

Output optics 48, also termed an eyepiece, may include one or more optical elements for gathering, directing, filtering, and/or focusing visible light from a display such that it may be viewed by a user's eye, thereby allowing or facilitating a user to see visible light images formed by the display. For example, the display and output optics may be selected and disposed so that a user's eye will perceive a magnified virtual image of the display (e.g., by positioning the display inside the focal point of a suitable convex eyepiece lens). Accordingly, the eyepiece may include any combination of the optical elements described above for the input optics. The eyepiece may define an optical path traveled by visible light from the display to the user's eye. Also, the eyepiece may form an optical window through which visible light emerges from a monocular assembly. Each eyepiece 48 and its associated display 46 may be described as a left or right visualization unit (60 or 62).

The input optical axes 30, 32 may have any suitable relation to one another and to output optical axes 38, 40. The spacing of the input axes may be fixed or adjustable. If adjustable, the spacing (e.g., the horizontal separation) between the cameras of assemblies 26, 28 may be adjustable, generally while keeping input axes 30, 32 parallel to one another. If adjustably spaced, one camera may be fixed and the other movable, or both cameras may be movable with respect to support assembly 29. If both cameras are movable, they may be movable independently of one another or movement of both cameras may be coupled. Adjustment of the spacing between the cameras (and thus between input axes 30, 32) may change the apparent depth of a scene perceived by a person using system 20. The spacing between input axes 30, 32 may be about the same as, greater than, or less than the spacing between output axes 38, 40. For example, the spacing may be between about 50 millimeters and 150 millimeters, among others. Input axes 30, 32 may be parallel to output axes 38, 40. Furthermore input axes 30, 32 may define a first plane and output axes may define a second plane, and the first and second planes may be parallel, such as substantially coincident or offset vertically from one another when the first plane is horizontal. Increasing the spacing between the input axes may facilitate use of larger objective lenses, increasing light collection (which may be especially useful under low-light conditions).

Cameras 56, 58 and visualization units 60, 62 each may be focused by any suitable mechanism. Focusing may be driven manually or with a motor, among others. Furthermore, focusing of each camera or visualization unit may be controlled manually or may be controlled automatically by controller 50 (e.g., to provide autofocusing).

Each camera may be focused independently or the cameras may be focused in unison. The focus may be adjusted by driving relative motion of the objective and sensor of the camera, generally to change their separation on the optical path. Accordingly, the objective, the sensor, or both may be moved with respect to support assembly 29. In some cases, system 20 may include a single focusing mechanism 64 capable of moving, at the same time (indicated at 66), both sensors 44 (or both objectives) closer to or farther from the objectives (or sensors). For example, both sensors may be attached to a carriage 68 that is mounted movably to the support assembly, to permit translational motion of the carriage that coordinately changes the length of the optical path from each sensor to its corresponding objective. Alternatively, or in addition, both objectives may be movable in unison by a single focusing mechanism (see Section III).

Visualization units 60, 62 may be focused coordinately or independently from one another. However, because the left eye and the right eye of a person may require a different correction, the ability to focus visualization units 60, 62 independently is generally preferable. The focus (also termed the diopter) may be adjusted by driving relative motion of the display and the eyepiece, to change their separation on the output optical path. In some cases, system 20 may include a pair of focusing mechanisms 70, 72 capable of independently moving, with respect to support assembly 29, a display (or eyepiece; see Section III) closer to or farther from its corresponding eyepiece (or display).

The focusing mechanisms may be described as a dual diopter adjustment, with the diopter adjustments for units 60, 62 being independent of one another. Exemplary diopters that may be achieved by the focusing mechanism include a negative diopter (e.g., −5, −4, −3, −2, and/or −1), a positive diopter (e.g., +1, +2, +3, +4, and/or +5), or any combination thereof.

Visualization units 60, 62 also may be adjustable to alter their spacing from one another (and particularly the spacing of output axes 38, 40, to match the spacing (i.e., the interpupillary distance (from about 50 to 75 millimeters)) between a given user's eyes. Both units may be movable with respect to support assembly 29 or one unit may be fixed and the other movable. If both are movable, the movement may be coupled or independent from one another. For example, system 20 may include an adjustment mechanism 74 that coordinately (i.e., simultaneously) moves both units, indicated at 76. (An adjustment mechanism that permits independent movement of visualization units is described in Section III.) Movement of the visualization units may be in a direction orthogonal to output optical axes 38, 40 and parallel to a plane defined by these axes. One or both visualization units may be moved without changing the rotational disposition of each display (as might occur if assemblies 26, 28 were pivoted relative to one another via a connecting hinge to change the spacing of the eyepieces).

Support assembly 29 may have any suitable structure. The support assembly (and/or system 20) may be configured to be hand-held, head-mounted, mounted to a vehicle (e.g., an aircraft, land vehicle, or watercraft), or the like. Accordingly, the support assembly (and/or system 20) may provide one or more mounting brackets, straps (for placement around the head, neck, arms, chest, etc.), arms for placement over ears, clips, etc. In some embodiments, the support assembly may be designed to be supported by a person's head and/or by a head cover (e.g., strapped or clipped to a helmet).

The binocular system may be sealed or sealable, such that the system is watertight and/or resistant to damage by sand or dust. In some embodiments, the system is sealed to restrict water entry, to permit submersion of the system in water without damage to internal components, such as cameras, displays, the controller, or other electronics. To provide a watertight system, the support assembly may be fluid-tight and may form a fluid-tight seal with the input and output optics. Alternatively, or in addition, the system may include a removable or integral cover for the input optics and/or the output optics that can form a fluid-tight seal with the support assembly. For example, the system may include one or more caps that can be secured removably over each eyepiece or objective, to block water inflow, and that may clip or otherwise attach to the support assembly. In some cases, the system may include an integral, optically transmissive window disposed over each objective and forming a non-moving seal that allows the system to be submersed in water and/or operate in extreme sand/dust environments.

Controller 50 may be any mechanism or collection of mechanisms responsible for manipulation of data and communication of signals between or among system components. The controller may be responsible for controlling operation of any suitable system components, for example, the cameras, the visualization units, and so on. Accordingly, the controller may be in communication with the sensors and displays, to receive signals from and/or send signals to the sensors and displays, and may be capable of controlling and/or responding to operation of the sensors and/or displays. Also, the controller may be responsible for manipulating (processing) image data (i.e., the representative video signals) received from the cameras before the signals are communicated to the visualization units, to drive formation of visible light images by the displays. The controller may include one or more processors (e.g., digital processors) for data manipulation and also may include additional electronic components to support and/or supplement the processors. In some embodiments, each monocular assembly may include a respective controller subunit (77A or 77B) that is responsible for operation of the sensor and display of the monocular assembly. With this division of labor, the controller subunits can operate in parallel to control generation of respective left and right video images by the displays. However, the controller subunits may be in communication with another. For example, one of the subunits may be a master and the other a slave controlled by the master. Also, one of the controller subunits (e.g., the master subunit) may be responsible for receiving inputs from a user via user interface 54.

Power supply 52 may be any mechanism for providing operating power to the system. The power supply may be line power, one or more batteries, or a combination thereof, among others. The power supply may be a source of power for the controller, sensors, displays, one or more focusing mechanisms, an illuminator, a rangefinder, or any combination thereof, among others. The power supply may include a central supply that is used directly or indirectly by all power-consuming components of the system and/or may include a plurality of individual power supply units that are integral to and/or dedicated to different components. The system may have an off mode, an on mode, and, optionally, a lower-power or sleep mode, among others.

User interface 54 may be any mechanism or combination of mechanisms that permits a user to communicate with controller 50 and/or other devices/mechanisms of the system, such as to set preferences, navigate through menus, select options, adjust a focus, adjust the intensity of a display, and so on. Exemplary user interfaces include one or more switches, buttons, levers, knobs, or dials; a joystick; a touchscreen; or any combination thereof, among others.

System 20 may be equipped with at least one data-sharing mechanism, such as at least one data port 78. The port may be a wired or wireless port. The port may be used for downloading and/or uploading data. For example, the port may be used to download instructions to controller 50, such as to provide a software update or to add additional functional capabilities to the controller. Alternatively, or in addition, the port may be used to upload data, such as image data (e.g., a dual-channel video signal representing left and right video signals), to other machines and/or users. The image data may be uploaded to an external storage device or an external display, among others. In some cases, the image data may be uploaded as a dual-channel video signal (i.e., a video stream containing a left video signal and a right video signal). The video stream may intersperse a left video signal and a right video signal, such as rapidly alternating left video and right video (e.g., alternating individual left and right images in the video stream). The video stream may be communicated to a three-dimensional display (e.g., to be viewed with appropriate 3D glasses) and/or to a remote pair of visualization units analogous to those of system 20, among others. The video stream may be communicated via data port 78 in real time (i.e., substantially immediately upon creation) or may be stored first in system 20 for a selectable/adjustable time interval before communication.

System 20 also may be equipped with at least one radiation source 80, for example, an illuminator to actively illuminate at least a portion of a scene and/or a designator to actively designate a target or targets. The radiation source may emit ultraviolet radiation, visible light, infrared radiation, or any combination thereof. The radiation source may be a laser, a light emitting diode, an incandescent light, or a fluorescent light, among others. Illumination provided may be continuous or intermittent (i.e., at regular or irregular intervals, such as by a strobe) when the radiation source is activated. Activation of the radiation source may be controlled by the user, the controller, or a combination thereof, among others.

System 20 further may be equipped with a range-finding mechanism 82. A range-finding mechanism is any mechanism that measures or enables measurement by a user of the distance from system 20 to an object in the scene and/or the distance between objects in the scene. Exemplary range-finding mechanisms include a laser rangefinder (for measuring the distance from system 20 to an object) or a reticle (for measuring the distance between objects in a scene). If a reticle is included, the reticle may be provided by one or more visualization units, such as formed by a display or included in an eyepiece. Another exemplary range-finding mechanism utilizes the controller to process image data from left and right cameras to determine the distance to an object in a scene by the extent of positional disparity exhibited by the object (e.g., the position of the object relative to background) in left and right images of the scene detected by the corresponding cameras.

System 20, particularly handheld embodiments, further may be equipped with image stabilization mechanisms to reduce image blurring and/or other artifacts caused by unintended motion of the binoculars, particularly rotation about axes oriented left-right and up-down ("pan" and "tilt," or "pitch" and "yaw"). Stabilization may be accomplished using any suitable mechanism(s). In some embodiments, stabilization may be accomplished by increasing the binoculars' moment of inertia—resistance to rotation—around these two axes, for example, by increasing the off-axis mass of the binoculars, by adding one or more gyroscopes (which must be powered), and so on. Alternatively, or in addition, stabilization also may be accomplished by sensing motion and actively adjusting the orientations and/or positions of optical elements, such as lenses and/or sensors, to compensate. Stabilization also may be accomplished after the image is collected but before it is displayed by shifting successive displayed images left or right, and/or up or down, frame to frame to compensate electronically for unintended motion that has not been prevented.

II. Controller Capabilities

This section describes exemplary controller capabilities that may be incorporated into the binocular system. The capabilities may be used together in any suitable combination and may be included in a binocular system having any combination of components and features of the present disclosure.

The controller may control generation of grayscale/color images by each display. The term "grayscale/color" means grayscale (or monochrome), color, or a combination of grayscale and color. The term "grayscale" also may be described as "black and white," which generally includes different shades of gray from white or near white to black or near black, but without chromatic variation. The term "color" generally includes one or more non-grayscale colors, such as one or more or a set of primary or secondary colors (e.g., red, blue, yellow, green, orange, violet, or a combination thereof), among others. Color video images may be a combination of grayscale and color, such as images that are substantially monochromatic but with color coding added to highlight regions (e.g., image pixels) of a scene that meet one or more predefined conditions (e.g., pixels having values that exceed a threshold).

The controller may assign grayscale intensities and/or colors to image data from each sensor according to default instructions and/or user input, among others. For example, the controller may utilize a look-up table and/or implement an equation to convert values in the representative signal from a sensor to grayscale/color pixel data to be implemented by a display. In any event, the controller may utilize the same grayscale/color palette for both displays or may have the ability to utilize different palettes. For example, the controller may contain a set of palettes from which one or more palettes can be selected for use in displaying images. The same or different palettes may be selected for the left display and the right display, to present images created with the same palette or different palettes to each eye (e.g., a grayscale palette for the left display (and left eye) and a color or grayscale plus color palette (e.g., a color-coded scheme) for the right display (and right eye), or vice versa). The palettes to be utilized for image generation by the displays may be selected by a user (such as via the user interface) or may be selected automatically by the controller (e.g., selected dynamically based on the signal from the sensor(s)).

The controller may be programmed to implement various colorizing techniques using the appropriate palette(s). In other words, the controller may be capable of instructing the displays to generate grayscale images, color images, and/or grayscale images with color added selectively. In a basic scheme, the controller assigns grayscale intensities to pixels of an image in a manner directly or inversely related to radiation intensities detected by the sensor (e.g., directly related for one of the displays and inversely related for the other display). For example, if this scheme is used for generating visible thermal images from detected infrared radiation, the hotter areas of the images are lighter and the colder areas are darker, to provide a "white-hot" polarity, or vice versa, to provide a "black-hot" polarity. The controller may drive generation of images with white-hot polarity or black-hot polarity by each display. In some cases, the controller may cause a white-hot polarity to be displayed to one eye and a black-hot polarity to be displayed to the other eye. Accordingly, the displays may present left and right video images with inverse grayscale polarity. This approach may facilitate recognition or rejection of regions of intermediate "temperature," because they will be displayed with similar intensities to both eyes.

Thermal (or other radiation) intensities can be color-coded in one channel only (left or right) or in both channels (left and right) using a color palette (e.g., with blue being coldest, green warmer, yellow still warmer, orange hotter, and red hottest, or any combination thereof, among others). Furthermore, thermal (or other radiation) intensities can be color-coded using a combination grayscale plus color palette, with one or more thresholds to define when to use grayscale or color for individual pixels. For example, low and intermediate thermal (or other radiation) intensities can be represented in grayscale while intensities above a threshold can be represented in color (e.g., red), such as to identify the hottest (or most intense) object(s)/region(s) in an image. Alternatively, or in addition, thermal (or other radiation) intensities below a threshold can be assigned another color (e.g., blue) to identify the coldest (or least intense) object(s)/region(s) in an image.

The controller may be programmed to color-code movement in displayed images. The color-coding may be performed in one channel (left or right) or in both channels (left and right). The controller may assign a color to an object that is moving with respect to a background and/or with respect to the user. For example, moving objects may be displayed in color (by one or both displays) and nonmoving objects displayed in grayscale or in a distinct color(s) from the moving object. A single color may be used to identify moving objects or more than one color may be used to indicate the speed and/or direction with which each object is moving. For example, a faster object may be presented in red and a slower object in green. The speed of an object can be determined by estimating the distance to the object with the binocular system (e.g., by positional disparity and/or with a rangefinder) and the rate at which the size or position of the object changes in the field of view. Alternatively, or in addition, objects moving toward or away from the user may be assigned respective distinct colors, for example, an object moving toward the user may be color-coded with red and an object moving away from the user with green. Object movement may be determined by processing image data for a series of images from one or more sensors. An object that increases (or decreases) in size over time can be color-coded as moving toward (or away from) the user. Alternatively, or in addition, active rangefinders could be used to collect such information.

The controller may be programmed to color-code distance in images displayed in only one channel (left or right) or in both channels (left and right). In particular, objects/features in the images may be color-coded according to their distance from the system/user. Color-coding may, for example, be implemented by adding color to a grayscale image, with one or more ranges color-coded. As an example, objects that are closer than (or greater than) a threshold distance from the user may be assigned a color. Different colors may be assigned for objects disposed within distinct ranges from the user. The distance to an object may be estimated by processing left and right image data, to find a positional disparity exhibited by the object in left and right images. Alternatively, or in addition, the distance to an object may be determined with a range-finding mechanism.

The controller may be programmed to provide an electronic zoom function that achieves a stepped change and/or a smooth change in magnification of displayed images. The zoom function may be actuated via a user interface that can be utilized to instruct the controller to increase or decrease the magnification.

The controller may be programmed to implement any suitable algorithms for processing image data. In some embodiments, the controller may be capable of adjusting the relatively intensities of image pixels, which may be implemented to improve image quality, reduce noise, lessen image pixelation, highlight image features, reduce the impact of flashes of radiation (scintillation mitigation), or any combination thereof, among others. For example, the controller may be configured to smooth out the quantized range caused by range pixelation. The controller also or alternatively may be capable of imposing a nonuniform correction (NUC) on image data to correct for nonuniform sensitivities or drift of the photosensitive elements of one or more sensors. Other algorithms may permit processing of one or more images from a scene to identify and/or characterize objects in the scene. Exemplary object identification/characterization may include motion detection, intent determination, facial recognition, or the like. For example, the algorithm may permit tracking an object within the field of view. The object may be identified to the controller by the observer (e.g., via the user interface) or the controller may identify the object by processing image data. In any event, the controller may display cues for the motion of the object, to direct the observer to slew in the direction of object motion.

The controller may be programmed to drive presentation of other information by one or both of the displays. The other information may (or may not) be presented on one or both displays in association with video images. The other information may be presented adjacent displayed images (e.g., in a top, bottom, or side bar) and/or partially or completely overlapping displayed images. Accordingly, the other information may be presented as an overlay that is fused with displayed images and at least partially blocks, obscures, replaces, and/or alters a region of displayed images. Exemplary other information that may be presented may be conveyed by symbols (e.g., characters (such as alphanumeric and/or other characters), icons, etc.), geometric shapes (e.g., line segments, circles, rectangles, etc.), and the like. The other information may be used for any suitable purpose, such as to offer menus and options for system operation, to display selected preferences and/or status information, to provide a legend summarizing the meaning of colors and/or symbols (especially if variable), to indicate an operating mode, to identify an object or image region, to indicate object range(s) with symbols, to mark a tracked or moving object or a path thereof, to prompt the user to act, or any combination thereof, among others.

The controller may drive presentation of the other information in both displays at the same time. The other information may be presented at the same relative position on both displays, such that there is no binocular disparity when the information is viewed by a pair of eyes. Alternatively, the other information may be presented with binocular disparity in left images relative to right images, to give the information a perceived depth, for a three-dimensional effect. For example, symbols may be presented with positional disparity in left video images relative to right video images, so that the symbols are perceived as three dimensional (i.e., as having depth) and/or as being disposed at one or more positions along a depth axis.

However, presenting the other information on both displays concurrently (i.e., in duplicate), in combination with left and right video images, can be distracting to the user. For example, the human visual system of the user may have difficulty uniting duplicated information from the displays and thus may perceive the duplicated information as a pair of offset copies rather than one copy. To avoid this problem, the controller may be programmed to drive presentation of other information by only one of the displays at a time as both displays present left video images and right video images, such that the other information is seen only with one eye when the video images are viewed with both eyes. With this configuration, the user can view stereoscopic left and right videos of detected radiation binocularly while the other information is viewed monocularly. In some embodiments, the user may be allowed to select which one of the displays is used for presenting other information.

The binocular system may be used when turned upside down (inverted), such that the left eye views the right display and the right eye views the left display. The controller may be programmed to respond to the orientation of the system by automatically orienting displayed symbols, such as alphanumeric characters, in correspondence with the normal or inverted orientation of the binocular system. As a result, the symbols may be oriented correctly (i.e., right side up) for viewing by the user in both system orientations.

Stated differently, alphanumeric characters may be flipped automatically for presentation in a right-side up orientation to a user when the binocular system is turned upside down. The system may be equipped with an orientation sensor, such as an accelerometer, a gyroscope, or an orientation-dependent switch, among others, to automatically determine whether the system is being used in a normal or inverted orientation. In some cases, rather than flipping the characters automatically, alphanumeric characters may be flipped in response to a user input that informs the controller of the orientation (i.e., right-side up or upside down) of the binocular system. For these cases, the user may serve as an orientation sensor.

The controller may be programmed to blend video signals detected with a pair of cameras, such as a left/right camera and a third camera. The pair of cameras may be configured to detect respective wavelength bands that are different from each other. The controller may blend video signals detected by a visible light camera and an infrared camera (e.g., an SWIR, MWIR, and/or LWIR camera), an ultraviolet camera and a visible light camera, an ultraviolet camera and an infrared camera (e.g., an SWIR, MWIR, and/or LWIR camera), distinct infrared cameras (e.g., an SWIR camera and an MWIR camera, an SWIR camera and an LWIR camera, an MWIR camera and an LWIR camera, two SWIR/MWIR/LWIR cameras, etc.), and so on. The pair of cameras may share an input optical axis and/or one or more optical elements for their respective input optics. Alternatively, the pair of cameras may have offset optical axes and/or respective input optics that are not shared with one another.

The controller may be programmed to accentuate contributions from within particular wavelength bands (e.g., to highlight humans, functioning equipment, and/or the like, based on their temperature).

III. Examples

The following examples describe selected aspects and embodiments of binocular systems. These examples are intended for illustration only and should not limit or define the entire scope of the present disclosure.

Example 1. Exemplary Infrared Binocular System

This example describes an exemplary embodiment of an infrared binocular system 120; see FIGS. 2-6.

Figure 2:
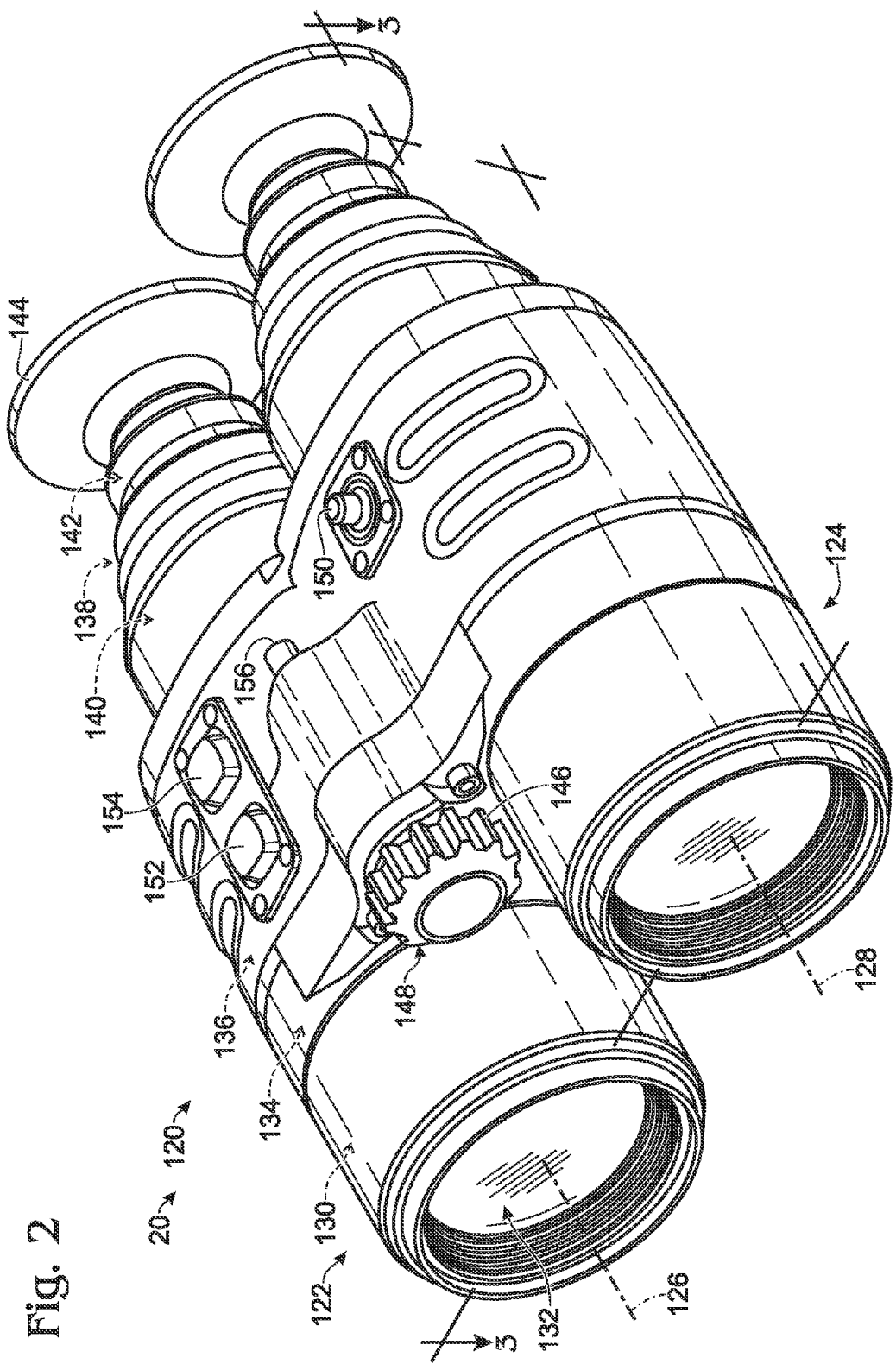
FIG. 2 is an isometric view of an exemplary infrared binocular system, in accordance with aspects of the present disclosure.
Figure 3:
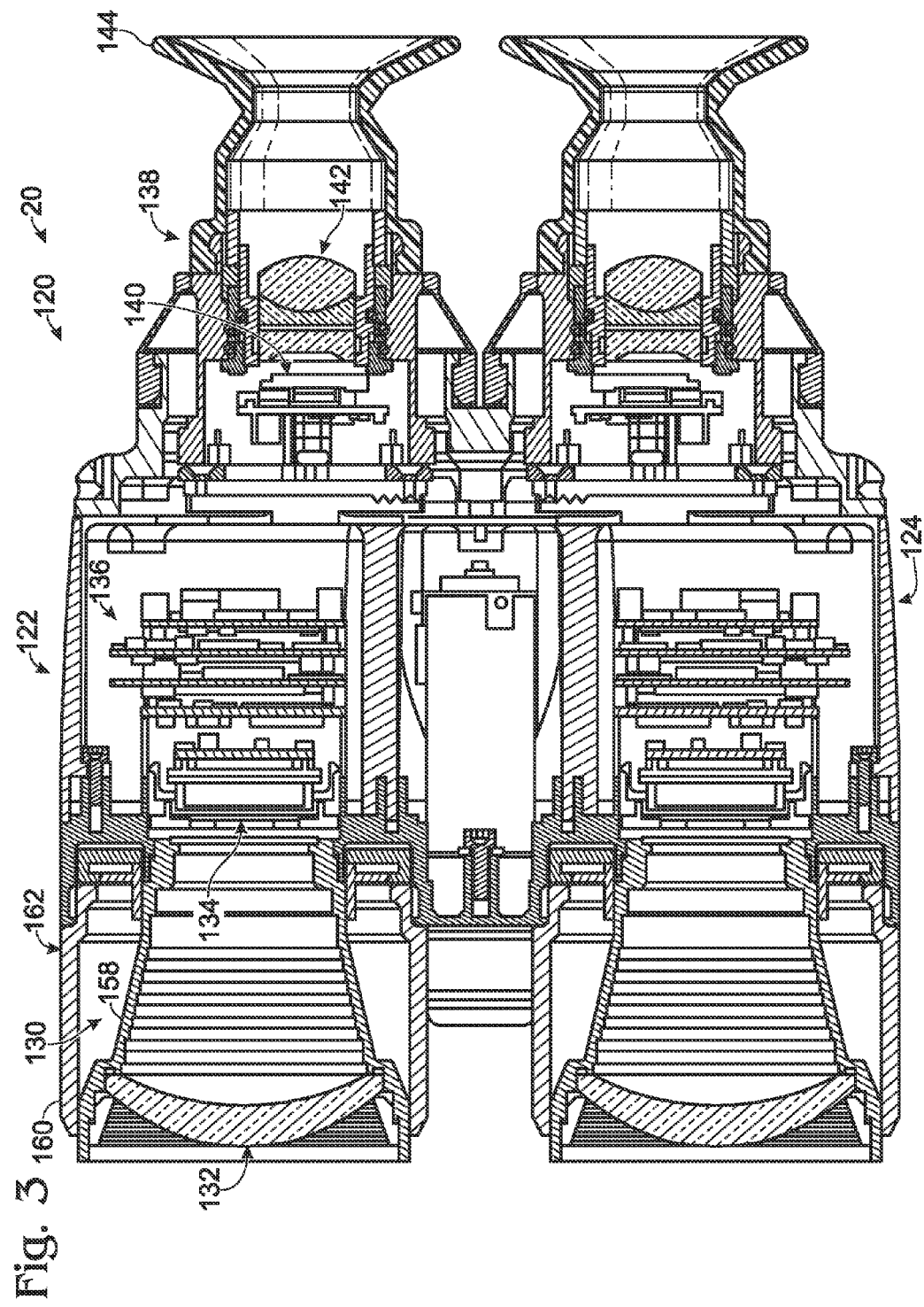
FIG. 3 is a sectional view of the infrared binocular system of FIG. 2, taken generally along line 3-3 in FIG. 2.

FIGS. 2 and 3 show respective isometric and sectional views of binocular system 120. The system includes a pair of monocular assemblies 122, 124 each capable of detecting incident infrared radiation received on input optical axes 126, 128 from a distant scene and presenting a visible light representation of the detected radiation to an observer. The monocular assemblies are mirror images of one another and contain substantially identical components.

Each assembly includes a thermal camera 130. The camera receives and focuses incident infrared radiation using objective 132. The radiation is focused onto a focal plane array 134 of the camera, which creates a signal (i.e., image/video data) representative of the detected radiation, which is communicated to a controller subunit 136.

Controller subunit 136 may process the signal (e.g., to assign color/grayscale to parts of the signal, add an overlay, etc.) and then uses the signal to drive presentation of visible light images by a visualization unit 138 of assembly 122 or 124. The visualization unit includes a display 140 that forms the images and an eyepiece 142 that focuses the formed images onto a user's left or right eye.

Each visualization unit also may incorporate an eyecup 144. The eye cup may be formed of a resilient material, such as an elastomer, to permit the eye cup to conform to the contours of a user's face when the eye cup is pressed against the face around the eye. The eye cup may function to space the user's eye reproducibly from the eyepiece, to achieve proper focus. The eye cup also may form a substantial seal generally around a user's eye to restrict leakage of light from the eyepiece during use, to maintain covertness.

System 120 also includes various mechanical and electronic controls that can be operated by a user (see FIG. 2). For example, a focusing knob 146 operates a mechanical focusing mechanism 148 for both objectives. Other controls that provide communication with the system's controller include a joystick 150, a nonuniform correction (NUC) button 152, and an electronic zoom button 154. A power switch 156 turns the system on and off.

Figure 4:
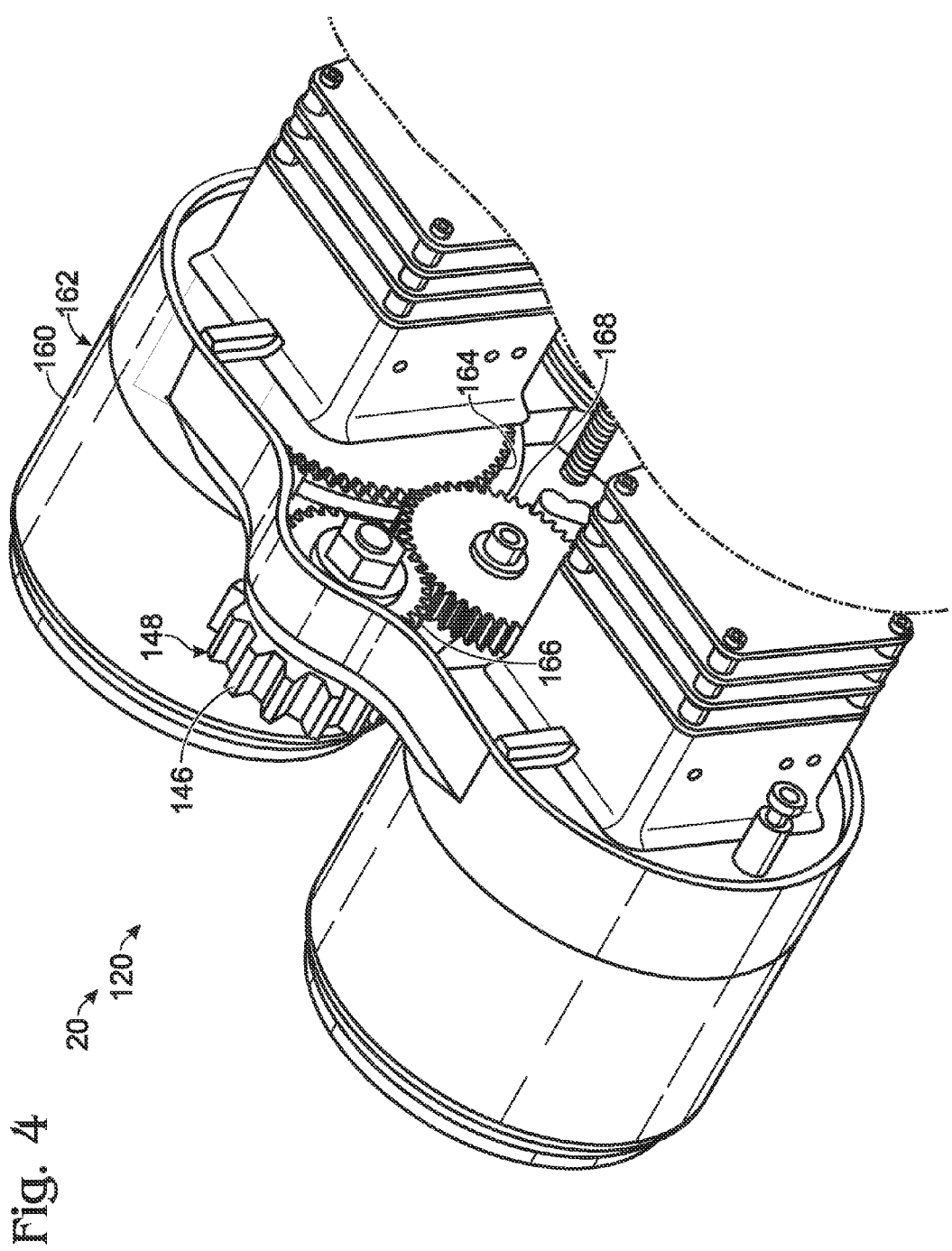
FIG. 4 is a fragmentary view of a distal portion of the infrared binocular system of FIG. 2, with part of the system's casing removed to reveal aspects of an objective focusing mechanism.

FIGS. 3 and 4 show aspects of the focusing mechanism for objectives 132. Each objective is held in place by a holder 158 received in a respective barrel 160 formed by the system's frame 162. Each holder 158 is in threaded engagement with barrel 160. The holder includes a gear 164 (a toothed wheel) extending around the holder (see FIG. 4). Knob 146 is connected to gear 164 of each holder 158 via shared intermediate gears 166, 168. Turning knob 146 causes coupled rotation of holders 158 of both monocular assemblies. Due to the threaded engagement, rotation of holders 158 causes the objectives to move along barrels 160, either closer to or farther from their associated sensors, according to the direction of rotation of knob 146, which provides simultaneous focus adjustment for both cameras.

Figure 5:
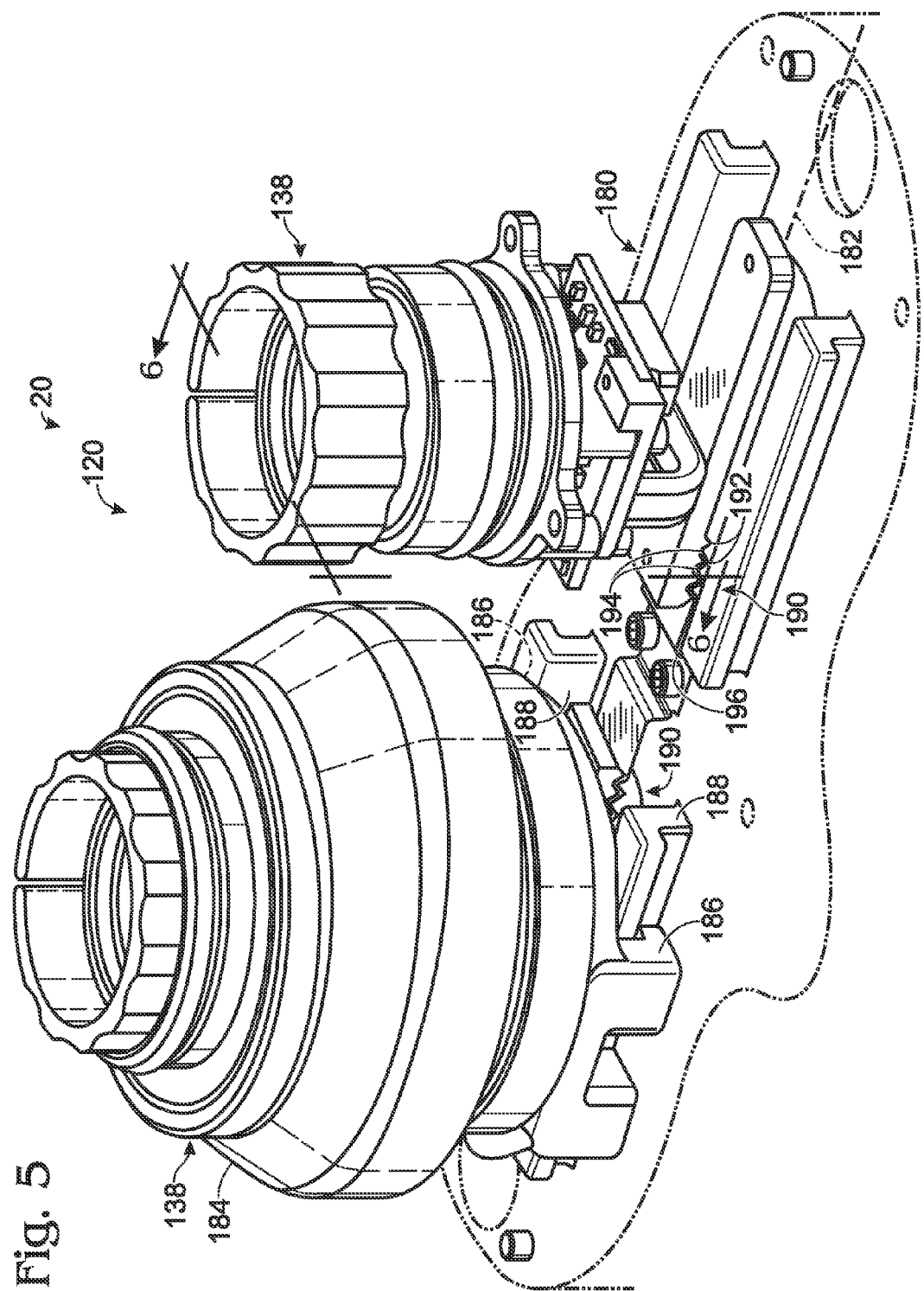
FIG. 5 is a fragmentary view of selected aspects of a proximal portion of the infrared binocular system of FIG. 2.

FIG. 5 shows aspects of an interpupillary adjustment mechanism 180 of system 120. Mechanism 180 permits visualization units 138 to be repositioned along an adjustment axis 182 that is orthogonal to a plane defined collectively by the optical axes of units 138. In this view, visualization units 138 have been partially disassembled, with eye cups 144 (see FIGS. 2 and 3) removed from both units, and a housing 184 removed from only one of the units. Visualization units 138 may have opposing hooks 186 that hook onto rails 188 provided by the system's frame, to permit each unit to slide along the rails. A separate detent mechanism 190 for each unit restricts sliding motion of the unit until sufficient force is applied to overcome the holding action of the detent mechanism. The detent mechanism includes teeth 192 formed on the underside of unit 138 and engaged by one or more complementary teeth 194 provided by a leaf spring 196. In some embodiments, only one of the visualization units may be movable to provide interpupillary adjustment.

Figure 6:
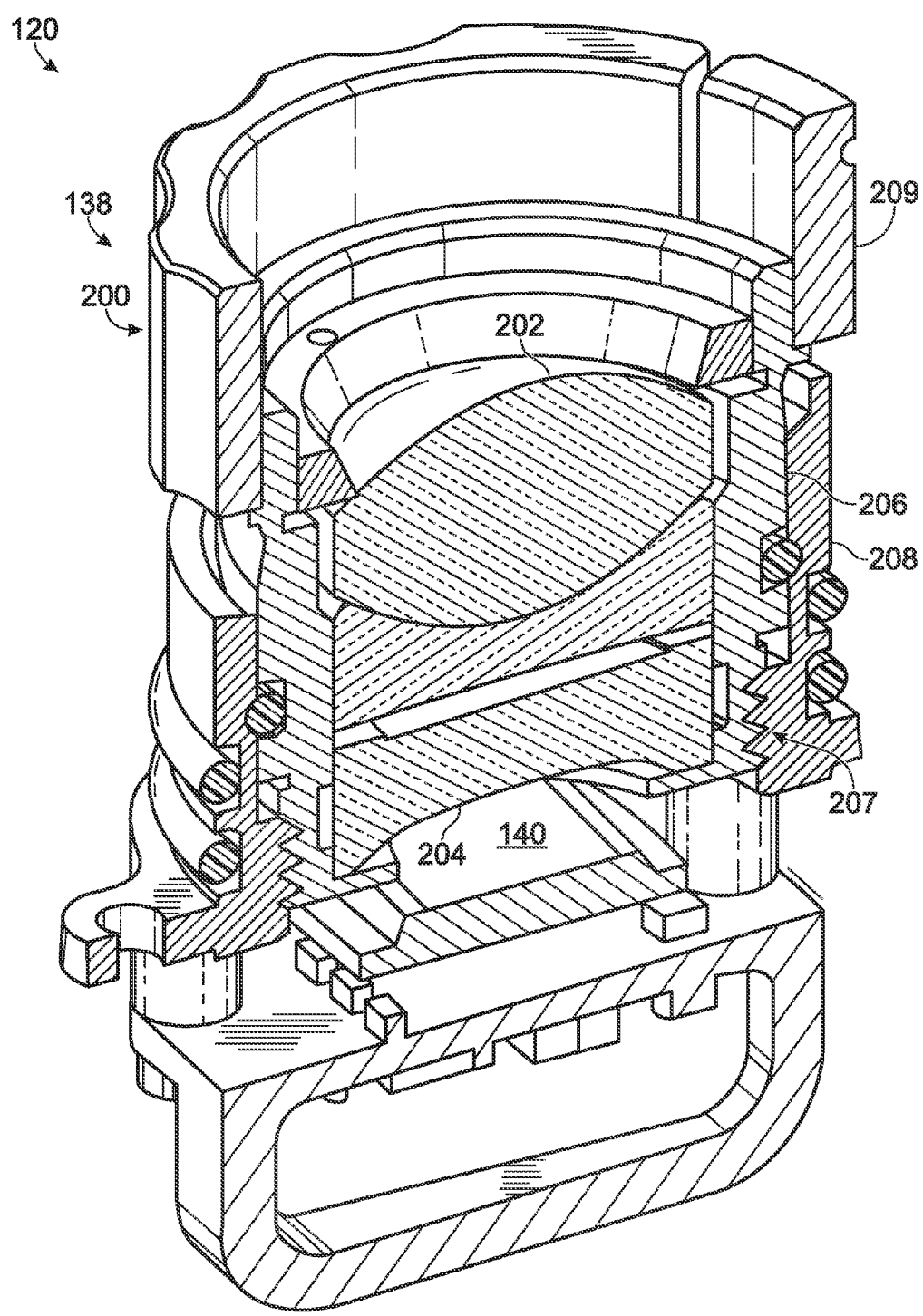
FIG. 6 is a sectional view of selected aspects of a visualization unit of the infrared binocular system of FIG. 2, taken generally along line 6-6 of FIG. 5.

FIG. 6 shows a sectional view of selected aspects of visualization unit 138. Each unit includes a diopter adjustment mechanism 200 that permits the unit to be used, in some cases, without a user's corrective lenses (e.g., glasses). The diopter adjustment mechanisms of units 138 can be adjusted independently of one another, to apply a different correction for each eye of a user. Eyepiece lenses 202, 204 are mounted in a holder 206 that is in threaded engagement, indicated at 207, with a sleeve 208 disposed within the unit's housing. The sleeve is prevented from rotating with respect to the system's frame. Holder 206 includes a dial 209 that facilitates turning the holder manually to change the threaded position of the holder with respect to sleeve 208, thereby moving the holder and its lenses either closer to or farther from display 140, to adjust the focus.

Mechanical features may prevent the complete unscrewing of the holder from the unit and also limit the adjustment range (such as to determine the diopter values that are permitted). Dial 209 has a tab that permits no more than about one complete rotation with respect to sleeve 208. The thread pitch of threaded engagement 207 determines the extent of diopter adjustment produced by the complete rotation.

Example 2. Exemplary Interpupillary Adjustment Mechanism

Figure 7:
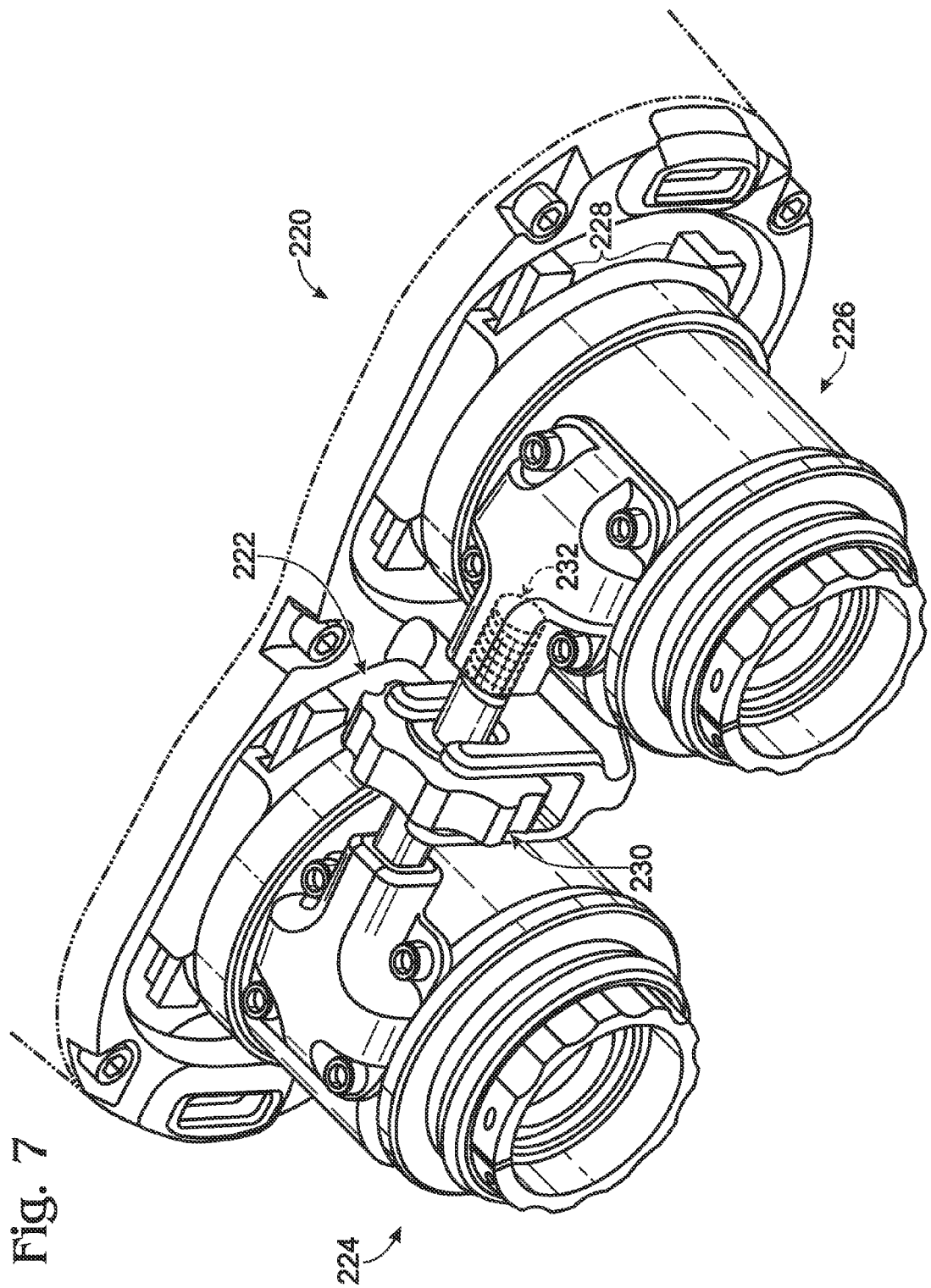
FIG. 7 is a fragmentary view of selected aspects of a proximal portion of another exemplary infrared binocular system, in accordance with aspects of the present disclosure.

This example describes another exemplary embodiment of an infrared binocular system 220 with an alternative interpupillary adjustment mechanism 222; see FIG. 7.

The binocular system includes a pair of visualization units 224, 226 each hooked onto and slidable on a pair of rails 228. The visualization units are connected via a thumbwheel assembly 230 that forms a span between the two units. Both ends of the thumbwheel assembly are in threaded engagement, indicated at 232, with a visualization unit. Rotation of the thumbwheel changes the length of the span between the units, which coordinately drives the units closer together or farther apart, depending on the direction of thumbwheel rotation. In other cases, one of the visualization units may be fixed and the other movable.

Figure 8:
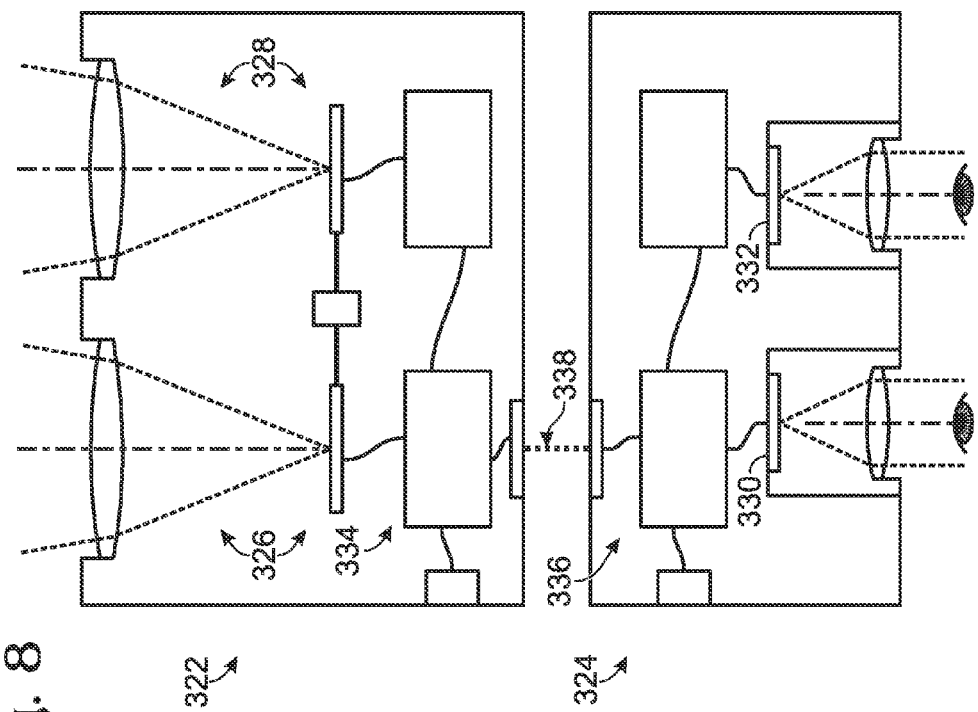
FIG. 8 is a schematic view of an exemplary binocular system including separate camera and visualization units, in accordance with aspects of the present disclosure.

Example 3. Exemplary Binocular System with Separate Units for Detection and Image Display This example describes an exemplary binocular system 320 divided into separate units; see FIG. 8.

System 320 includes a camera unit 322 and a presentation unit 324. The camera unit is equipped with at least two cameras 326, 328 adapted to create left and right video signals, which are communicated to the presentation unit for presentation of left and right videos by displays 330, 332 based on the video signals. Alternatively, or in addition, the left and right video signals may be communicated to a 3D display. One or both units 322, 324 may include a controller 334, 336 that manipulates the video signals and/or drives presentation of video images by the displays. Units 322, 324 may communicate with one another via a wired or wireless mechanism, indicated at 338.

The units may be movable independently of one another along and/or about multiple axes. With this arrangement, the camera unit can be mounted remotely from a user, such as on a land-based vehicle, an aircraft, a building, a geographical feature, and so on. For example, the camera unit may be supported by a gimbal system that controllably adjusts the orientation of the camera unit independently of the presentation unit. System 320 thus may be utilized on an aircraft as an enhanced vision system and/or as part of a navigation system.

Example 4. Exemplary Binocular Systems with Additional Cameras

Figure 9:
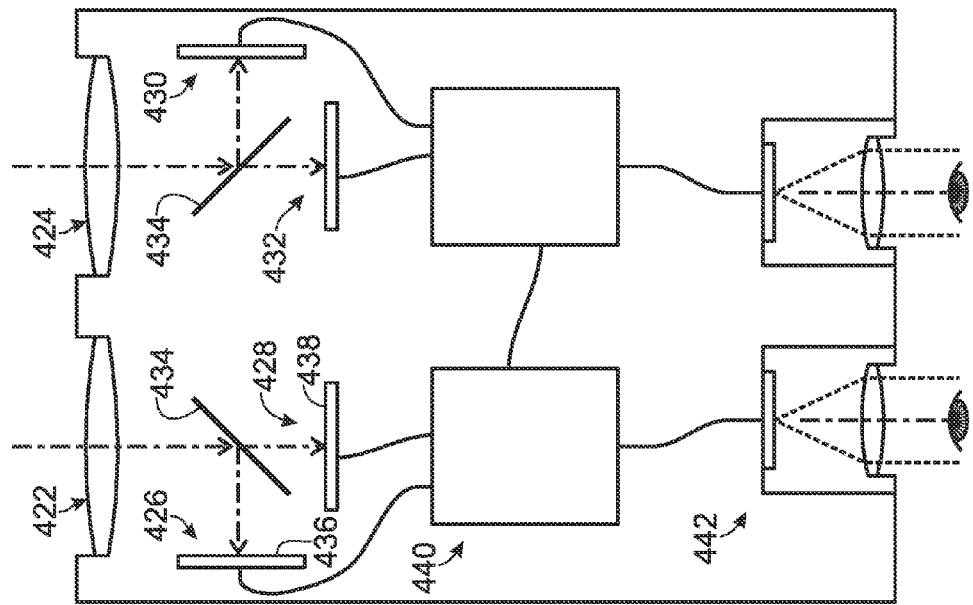
FIG. 9 is a schematic view of an exemplary binocular system incorporating at least one additional camera, in accordance with aspects of the present disclosure.
Figure 10:
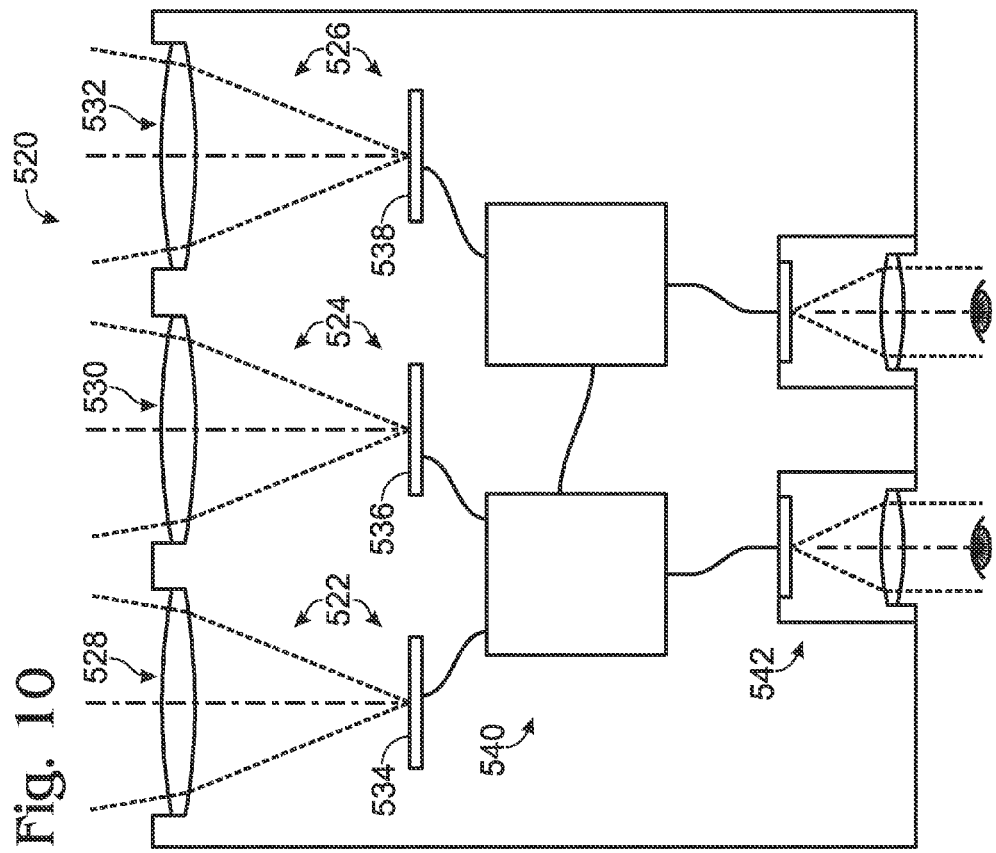
FIG. 10 is a schematic view of another exemplary binocular system incorporating at least one additional camera, in accordance with aspects of the present disclosure.

This example describes exemplary binocular systems with more than two cameras; see FIGS. 9 and 10.

FIG. 9 shows a schematic view of an exemplary binocular system 420 incorporating at least one additional camera relative to system 20 (see FIG. 1). The system may receive incident light from a scene via left and right optical assemblies 422, 424. One or both of the optical assemblies may be part of two cameras, such as cameras 426, 428 for assembly 422, and cameras 430, 432 for assembly 424. The two cameras on the left, 426 and 428, may share the same input optical axis for receiving incident light, as may the two cameras on the right.

Incident light received on the left (and/or right) may be split, such as with a beam splitter 434, to direct the light to distinct sensors 436, 438 of respective cameras 426, 428 (and/or distinct sensors of cameras 430, 432). The beam splitter may or may not divide the light beam according to wavelength. For example, the beam splitter may permit visible light (or a first wavelength band of infrared radiation) to pass through the beam splitter to sensor 438, while reflecting infrared radiation (or a distinct second wavelength band of infrared radiation) to sensor 436, or vice versa. In any event, sensors 436, 438 create respective video signals, which may be communicated to a controller or controller subunit 440. The controller may blend the video signals, by blending images detected by sensor 436 with images detected contemporaneously by sensor 438. The blended images may be displayed by a visualization unit 442.

A blended image or video signal may include any image or video signal that incorporates image data detected by more than one camera. Blending of images or signals may utilize any suitable portion or all of each detected image or signal. Blending may involve any suitable computation, which may or may not be performed on a pixel-by pixel basis. Exemplary blending operations include taking a sum, a difference, an average, implementing a threshold-dependent change, or the like. As an example, a visible image (or a first infrared image) may be blended with an infrared image (or a second infrared image) by generating the visible (or first infrared) image in grayscale while color-coding pixels that, in the corresponding infrared (or second infrared) image, are above (or below) a threshold value. In some embodiments, a controller may be programmed to display the images from two cameras (such as cameras 426, 428) separately instead of or in addition to blending video signals. For example, the controller may alternate display by a visualization unit of video or images from the two cameras.

In alternative embodiments, sensor 436 may be transmissive for the wavelength range to be detected by sensor 438. The sensors thus may be disposed on substantially the same optical path, with the array of photosensitive elements of sensor 436 overlying the other sensor's array. With this configuration of sensors, beam splitter 434 may be omitted.

FIG. 10 shows a schematic view of another exemplary binocular system 520 incorporating at least one additional camera relative to system 20 (see FIG. 1). The system may include at least three cameras 522, 524, 526, each equipped with separate input optics 528, 530, 532 and sensors 534, 536, 538. The third (or higher order) camera may be integral to the system or may be a module that can be added and removed. A controller 540 may blend video signals from any combination of cameras, such as cameras 522, 524, for display by a visualization unit 542. The third (or higher order) camera may have an input optical axis that is parallel to the input optical axes of the first and second cameras. The input optical axis of the third camera may or may not be coplanar with the input optical axes of the first and second cameras. The input optical axis of the third camera may be spaced horizontally and/or vertically from the axes of the first and second cameras.

The use of at least three cameras may permit various types of blended video signals to be created by a controller, to drive presentation of blended images by the displays. For example, left and right visible images (from detected visible light) may be blended on only one side (left or right) or on both sides (left and right) with detected infrared images (SWIR, MWIR, and/or LWIR). Alternatively, left and right infrared images may be blended on only one side or on both sides with visible images (from detected visible light). As another example, left and right infrared images (from detected SWIR, MWIR, and/or LWIR wavelength bands) may be blended on only one side or on both sides with infrared images detected from at least one different wavelength band, such as LWIR images on the left and right blended with SWIR images on only the left or right (or both left and right).

Example 5. Exemplary Binocular System with Optically Combined Images

Figure 11:
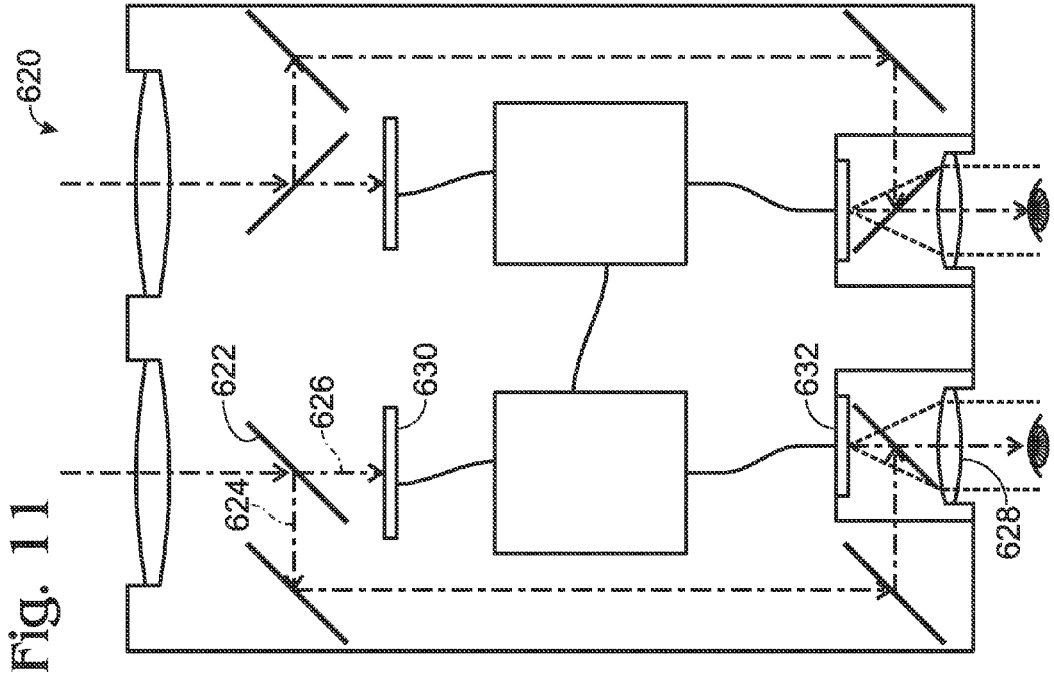
FIG. 11 is a schematic view of an exemplary binocular system that optically combines displayed images with images formed by focusing incident light, in accordance with aspects of the present disclosure.

This example describes an exemplary binocular system 620 that optically combines detected images with images formed by focused incident radiation; see FIG. 11.

System 620 may be structured generally as described for system 20 of FIG. 1. However, incident radiation is split by a beam splitter 622 to follow distinct paths 624, 626. Radiation traveling on path 624 is directed to an eyepiece 628 as a bypass image formed of visible light. In contrast, radiation traveling on path 626 is detected by a sensor 630, and the detected image is reproduced with visible light by a display 632 that is also operatively connected to eyepiece 628. As a result, reproduced images (e.g., from detected visible light or infrared radiation) and bypass images are combined at the (left and/or right) eyepiece to form optically blended images for the user.

Example 6. Selected Aspects and Applications

This example describes selected aspects and applications of the binocular system disclosed herein.

Exemplary binocular systems in accordance with the present disclosure may include one or more of the following features:
(i) IR binocular imaging using HVS to perceive 3D depth cues;
(ii) Separate left/right displays using HVS to perceive 3D;
(iii) Two camera (any waveband) binocular video imaging using HVS to perceive 3D;
(iv) Two camera (different wavebands) binocular imaging using HVS to perceive 3D;
(v) Three camera imaging system: two cameras give binocular 3D, third camera adds additional cues;
(vi) True 3D depth perception head-mounted system providing IR situational awareness;
(vii) Passive range finding using binocular disparity; and
(viii) Relative distance cueing in display.

The binocular system may be used for any suitable applications. An exemplary application of the system includes use as an aid for walking at night; for example, the IR binocular system may be mounted on a helmet to provide depth perception at night. Other exemplary applications may include military, safety, firefighting, border and perimeter control, hunting, and/or bird watching (e.g., night birds such as owls), among others. Exemplary applications also may include detection of disturbed earth (e.g., to find buried explosive devices or other buried objects, graves, etc.). Further exemplary applications include detection of gas emission/leakage (e.g., detection of carbon dioxide, sulfur hexafluoride ($SF_6$), etc.). The gas emission may, for example, be produced by an illegal manufacturing facility (such as for drugs, explosives, or the like).

The cameras of the binocular system may be configured to detect different wavelengths that respectively (a) include or exclude a Restrahlen (commonly spelled "reststrahlen") band of soil or (b) include or exclude an absorption band of a gas of interest. For example, the cameras may include respective distinct LWIR filters that include or exclude the Restrahlen band or absorption band.

A Restrahlen band (also termed a Restrahlen feature) of a material is a wavelength band of optical radiation where the ability of the material to reflect optical radiation increases. If the material is a good absorber in this band, the emission of optical radiation by the material dips in the Restrahlen band. Generally, the emission of thermal radiation emitted from soil changes with the soil's grain size in a Restrahlen band for the soil, with smaller grains exhibiting higher emission than larger grains. Disturbing soil (such as by burying an object) can locally decrease the grain size near the surface, which can result in higher emissivity of thermal radiation in a Restrahlen band of the soil.

The position of the Restrahlen band may be dependent on the soil composition. For example, silicate-rich soils have a different Restrahlen band than carbonate-rich soils. Accordingly, suitable filters (and/or sensors) may be selected according to soil composition.

In any event, one (or more) of the cameras may be configured to detect thermal radiation in a Restrahlen band of soil (e.g., in the LWIR range). In some embodiments, both of the cameras may be configured to detect in the LWIR range and only a first camera may detect thermal radiation substantially in the Restrahlen band. The second camera may be configured to selectively detect thermal radiation that excludes the Restrahlen band, which may provide a control or reference for variations in LWIR radiation that are not dependent on differences in grain size.

The following illustration for detection of disturbed soil is exemplary. Quartz-rich soils exhibit a Restrahlen band between about 8.2 and 9.5 μm. Two LWIR cameras may be utilized in the binocular system. One of the cameras may include a high cut-off filter that blocks LWIR of greater than about 9.5 μm, to detect variations in grain size near the surface. The other camera may have a low cut-off filter that blocks LWIR of less than about 9.5 μm.

Gas detection may be performed with the binocular system. One (or both) of the cameras may be configured, such as with a suitable filter, to detect radiation in a wavelength range overlapping an absorption band of a gas of interest (e.g., carbon dioxide, sulfur hexafluoride, or the like). The other camera may be configured to detect radiation in a distinct wavelength range, such as a wavelength range that substantially excludes the absorption band. If the gas is present, it will absorb thermal radiation emitted by objects behind the gas in the field of view, to reveal the presence of the gas.

The following illustration for detection of a gas of interest is exemplary. Sulfur hexafluoride is a potent greenhouse gas that has numerous uses in manufacturing and in high voltage systems, among others. This gas has an absorption band in the LWIR range centered at about 10.5 μm. Two LWIR cameras may be utilized in the binocular system. One of the cameras may have a high cut-off filter that blocks LWIR of less than about 10 μm, to permit detection of LWIR absorption by sulfur hexafluoride. The other camera may have a low cut-off filter that blocks LWIR of greater than about 10 μm, which may serve as a control or reference showing variations in thermal emission that are not dependent on the presence of sulfur hexafluoride.

Example 7. Selected Embodiments

This example describes selected embodiments and aspects of the present disclosure as a series of numbered paragraphs.

1. A binocular system, comprising: (A) a left camera and a right camera that create left and right video signals from detected optical radiation received from about a same field of view along respective left and right optical axes that are parallel to and offset from each other, at least one of the cameras including a sensor that is sensitive to infrared radiation; and (B) a left display and a right display arranged to be viewed by a pair of eyes and configured to present left and right video images formed with visible light based respectively on the left and right video signals.

2. The binocular system of paragraph 1, wherein the left camera is configured to detect a first wavelength band of optical radiation and the right camera is configured to detect a second wavelength band of optical radiation, and wherein the first wavelength band and the second wavelength band are different from each other 3. The binocular system of paragraph 1 or 2, wherein the left camera includes a first sensor and the right camera includes a second sensor, and wherein the first sensor and the second sensor are sensitive to respective wavelength bands of optical radiation that are different from each other.

4. The binocular system of any of paragraphs 1 to 3, wherein the left camera includes a first sensor and first input optics and the right camera includes a second sensor and second input optics, and wherein the first input optics and second input optics transmit respective wavelength bands of optical radiation that are different from each other to the corresponding sensors.

5. The binocular system of paragraph 4, wherein the first sensor and the second sensor are sensitive to a same wavelength band of optical radiation.

6. The binocular system of any of paragraphs 2 to 5, wherein the first wavelength band and the second wavelength band overlap one another.

7. The binocular system of any of paragraphs 1 to 6, wherein each of the cameras is an infrared camera.

8. The binocular system of paragraph 7, wherein one of the cameras detects short-wave infrared (SWIR) radiation and the other of the cameras detects mid-wave infrared (MWIR) radiation and/or long-wave infrared (LWIR) radiation.

9. The binocular system of paragraph 7, wherein both of the cameras detect mid-wave infrared radiation and/or long-wave infrared radiation.

10. The binocular system of paragraph 7, wherein both of the cameras detect short-wave infrared radiation.

11. The binocular system of any of paragraphs 1 to 4, wherein one of the cameras is a visible light camera and the other of the cameras is an infrared camera.

12. The binocular system of paragraph 11, wherein the infrared camera detects short-wave infrared radiation.

13. The binocular system of paragraph 11, wherein the infrared camera detects mid-wave infrared radiation and/or long-wave infrared radiation.

14. The binocular system of any of paragraphs 1 to 13, wherein one or both of the cameras includes input optics that include a filter that filters optical radiation before such radiation is detected by a camera.

15. The binocular system of paragraph 14, wherein the filter selectively blocks only part of the spectrum of infrared radiation.

16. The binocular system of paragraph 15, wherein the filter selectively blocks only part of the spectrum of long-wave infrared radiation.

17. The binocular system of paragraph 14, wherein each camera includes one or more filters, and wherein the one or more filters of the left camera and of the right camera filter optical radiation differently from each other.

18. The binocular system of paragraph 14, wherein each camera includes one or more filters than selectively block only a portion of the spectrum of infrared radiation.

19. The binocular system of paragraph 18, wherein the one or more filters of each camera selectively block respective wavelength bands of long-wave infrared radiation that are different from each.

20. The binocular system of paragraph 14, wherein the filter is configured to be attached removably to a camera, over an objective lens of such camera.

21. The binocular system of any of paragraphs 1 to 20, further comprising a controller programmed to control presentation of left video images and right video images by the displays using a different palette for each display.

22. The binocular system of paragraph 21, wherein one of the palettes is a grayscale palette and the other palette includes one or more colors that are not grayscale, and/or wherein a first of the palettes is monochromatic and a second of the palettes includes at least one color absent from the first of the palettes, and/or wherein one of the palettes is monochromatic and the other palette is polychromatic, or wherein each of the palettes is a grayscale palette and the grayscale palette for the left display is of inverse polarity from the grayscale palette for the right display.

23. The binocular system of any of paragraphs 1 to 22, further comprising a controller programmed to manipulate one or both video signals to create a manipulated version of one or both video signals and to drive presentation of video images by one or both displays using the manipulated version.

24. The binocular system of any of paragraphs 1 to 23, wherein the cameras are included in a camera unit and the displays are included in a presentation unit, and wherein the camera unit is movable independently of the presentation unit.

25. The binocular system of any of paragraphs 1 to 24, wherein the left video images and the right video images are configured such that a person viewing such images via the left and right displays can integrate left images with right images to obtain three-dimensional information.

26. The binocular system of any of paragraphs 1 to 25, wherein a relative intensity of left video images compared to right video images is adjustable by a user.

27. The binocular system of paragraph 26, wherein an intensity of left video images presented by the left display and an intensity of right video images presented by the right display are each adjustable independently of one another by a user.

28. The binocular system of any of paragraphs 1 to 27, further comprising a controller and a third camera that creates a third video signal, wherein the controller is programmed to blend the third video signal with another of the video signals to produce a blended signal, and wherein a display is configured to present video images based on the blended signal.

29. The binocular system of paragraph 28, wherein the third camera receives optical radiation along an optical axis that is spaced from the optical axes along which the left and right cameras receive optical radiation.

30. The binocular system of any of paragraphs 1 to 29, wherein the displays are capable of presenting alphanumeric characters and/or other symbols with a single display as both displays present video images, such that the characters and/or symbols are seen only with one eye when the video images are viewed by a pair of eyes.

31. The binocular system of any of paragraphs 1 to 30, wherein each display is operatively connected to a respective eyepiece, and wherein a focus of each eyepiece is adjustable independently of the other eyepiece.

32. The binocular system of paragraph 31, wherein a focus of each eyepiece is adjustable by moving the corresponding display while such eyepiece remains stationary.

33. The binocular system of any of paragraphs 1 to 32, wherein the displays are capable of presenting other information with a single display as both displays present video images, such that the other information is only seen with one eye when the video images are viewed by a pair of eyes.

34. The binocular system of paragraph 33, wherein the other information includes one or more alphanumeric characters and/or other symbols.

35. The binocular system of paragraph 33 or 34, wherein the other information at least partially overlaps video images presented by the single display.

36. The binocular system of any of paragraphs 33 to 35, wherein the other information and video images are presented at least partially adjacent each other by the single display.

37. The binocular system of any of paragraphs 1 to 36, further comprising a controller programmed (a) to determine a distance from the system to an object represented in the video images based on processing the left and right video signals, and (b) to drive presentation of an indication of the distance by at least one of the displays.

38. The binocular system of paragraph 37, wherein the controller is programmed to cause at least a portion of a representation of the object in one or more of the video images to be displayed in a color that indicates the distance.

39. The binocular system of paragraph 37, wherein the controller is programmed to indicate the distance as other information that is displayed along with the video images.

40. The binocular system of any of paragraphs 1 to 39, further comprising a controller and a third camera that creates a third video signal, wherein the controller is programmed to blend the third video signal with another of the video signals to produce a blended signal, and wherein a display is configured to present video images based on the blended signal.

41. The binocular system of paragraph 40, wherein the third camera receives optical radiation along an optical axis that is spaced from the optical axes along which the left and right cameras receive optical radiation.

42. The binocular system of paragraph 40, wherein the third camera shares at least part of an optical axis with another of the cameras.

43. The binocular system of any of paragraphs 1 to 42, further comprising a controller operatively connected to the displays and programmed to drive presentation of left video images and right video images formed using a different palette for each display.

44. The binocular system of paragraph 43, wherein the controller is programmed to drive presentation of black-and-white video images by one of the displays and video images including at least one color absent from the black-and-white videos by the other display.

45. The binocular system of any of paragraphs 1 to 44, further comprising a controller that is operatively connected to the displays, wherein the controller is programmed to drive display of alphanumeric characters by at least one of the displays, and wherein the controller is programmed to flip the alphanumeric characters automatically and/or in response to a user input, for presentation of the characters in a right-side up orientation to a user when the binocular system is turned upside down.

46. The binocular system of any of paragraphs 1 to 45, wherein each display is operative connected to any eyepiece, further comprising an eye cup connected to each eyepiece and configured to form a substantial seal generally around a user's eye to restrict leakage of light.

47. The binocular system of any of paragraphs 1 to 46, wherein each camera includes an objective lens that includes a diamond coating and/or a diamond-like carbon coating on an exterior surface region of the objective lens.

48. The binocular system of any of paragraphs 1 to 47, further comprising a controller programmed to process image data in the video signals and to control presentation of video images by the displays based on the processed image data, wherein the controller is programmed to process the image data to perform facial recognition, scintillation mitigation, nonuniform correction, intent determination, or any combination thereof.

49. The binocular system of any of paragraphs 1 to 48, further comprising a controller programmed to implement an electronic zoom of presented video images.

50. The binocular system of paragraph 49, wherein the controller is programmed to implement a stepped zoom in response to user input.

51. The binocular system of paragraph 48 or 49, wherein the controller is programmed to implement a smooth zoom in response to user input.

52. The binocular system of any of paragraphs 1 to 51, further comprising a controller operatively connected to the displays and programmed to drive presentation of left video images and right video images formed using a different palette for each display.

53. The binocular system of paragraph 52, wherein the controller is programmed to drive presentation of black-and-white video images by one the displays and color video images by the other display.

54. The binocular system of paragraph 53, wherein the color video images include regions that are black and white.

55. The binocular system of paragraph 52, wherein the controller is programmed to drive presentation of video images that are at least substantially black and white and have inverse polarity relative to one another.

56. The binocular system of any of paragraphs 1 to 55, further comprising head-mounting structure configured to permit the binocular system to be mounted on a user's head.

57. The binocular system of any of paragraphs 1 to 56, further comprising a port configured to permit a dual-channel video signal representing the left and right video signals to be outputted by the binocular system.

58. The binocular system of any of paragraphs 1 to 29, 31, 32, and 37 to 57, further comprising a controller programmed to drive presentation of alphanumeric characters and/or other symbols with a positional offset in left video images relative to right video images, thereby causing the characters and/or other symbols to be perceived as being disposed at one or more positions along a depth axis when viewed by a user.

59. The binocular system of any of paragraphs 1 to 58, wherein the system is sealed to restrict water entry, to permit submersion in water without damaging the cameras or displays.

60. A method of providing video of a scene, comprising: (A) creating left and right video signals from incident optical radiation received from about a same field of view along left and right optical axes that are parallel to and offset from one another, the left and right video signals respectively representing optical radiation detected from a first wavelength band and a second wavelength band, the first and second wavelength bands being different from each other and at least one of the wavelength bands including infrared radiation; and (B) presenting left and right video images formed with visible light based respectively on the left and right video signals.

61. The method of paragraph 60, further comprising a step of receiving the left and right video images at respective left and right eyepieces arranged to be aligned with a pair of eyes.

62. The method of paragraph 60 or 61, wherein the step of creating is performed with a plurality of sensors, further comprising a step of placing a filter in an optical path to a sensor before the step of detecting.

63. The method of paragraph 62, wherein the step of placing a filter includes a step of placing a filter over an objective lens.

64. The method of any of paragraphs 60 to 63, wherein the step of creating includes a step of detecting radiation from within a first wavelength band and a second wavelength band that are both infrared radiation.

65. The method of any of paragraphs 60 to 64, further comprising a step of presenting other information with one of the displays as both displays present video images, such that the other information is only seen with one eye when the video images are viewed by a pair of eyes.

66. A method of providing video of a scene, comprising: (A) detecting optical radiation received from about a same field of view along respective left and right optical axes that are parallel to and offset from one another, to create left and right video signals; (B) driving presentation of left and right video images formed with visible light based respectively on the left and right video signals; (C) receiving the left and right video images at respective left and right eyepieces arranged to be aligned with a left eye and a right eye of a person; and (D) driving presentation of other information by one of the displays as both displays present video images, such that the other information is only seen with one eye when the video images are viewed by a pair of eyes.

67. The method of paragraph 66, wherein the step of driving presentation of other information includes a step of incorporating an overlay into video images presented by the one display.

68. The method of paragraph 66 or 67, wherein the step of driving presentation of other information includes a step of driving presentation of one or more alphanumeric characters and/or other symbols.

69. A method of observing a scene, comprising: (A) aiming a left camera and a right camera at a scene to create left and right video signals from detected optical radiation received from about a same field of view of the scene along respective left and right optical axes that are parallel to and offset from one another, the left camera and the right camera being configured to detect optical radiation from respective first and second wavelength bands that are different from one another, at least one of the cameras including a sensor that is sensitive to infrared radiation; and (B) viewing, with respective left and right eyes, left video images and right video images formed with visible light based on the corresponding left and right video signals.

70. The method of paragraph 69, wherein the step of aiming includes a step of aiming a camera unit that includes the left camera and the right camera, and wherein the step of viewing includes a step of viewing video images provided by a presentation unit that is remote from the camera unit.

71. The method of paragraph 70, wherein the step of aiming includes a step of moving the camera unit independently of the presentation unit.

72. The method of any of paragraphs 69 to 71, wherein the step of viewing is performed to identify areas in which soil has been disturbed.

73. The method of paragraph 72, wherein the soil has a Restrahlen band, and wherein only one of the cameras is configured to detect optical radiation substantially in the Restrahlen band.

74. The method of paragraph 69, wherein the step of viewing is performed to identify sites of gas emission and/or gas leakage for a gas of interest.

75. The method of paragraph 74, wherein the gas of interest has an absorption band, and wherein only one of the cameras is configured to detect optical radiation substantially in the absorption band.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

The invention claimed is:

1. A binocular system, comprising:
a housing;
a left and a right input optics coupled to the housing;
a left camera comprising a left sensor and a right camera comprising a right sensor that create left and right video signals from detected optical radiation received from the corresponding left and right input optics about a same field of view along respective left and right input optical axes that are parallel to and offset from each other, at least one of the cameras including a sensor that is sensitive to infrared radiation, wherein the left and right cameras are coupled to and within the housing, wherein the left and right sensors are configured to independently move to change a length of an optical path relative to the corresponding left and right input optics, and wherein the left and right input optics are configured to be stationary while the left and right sensors move; and
a left display and a right display coupled to and within the housing and arranged to be viewed by a pair of eyes of a user and configured to present left and right video images formed with visible light based respectively on the left and right video signals,
wherein each left and right display is operatively connected to a respective left and right eyepiece,
wherein the left and right eyepiece are adjustable independently of each other by moving the left and/or right display and associated eyepiece in a direction orthogonal to respective left and right output optical axes; and
wherein a focus of the left and right eyepiece is adjustable independently of each other by moving the corresponding display along respective left and right output optical axes while the left and right eyepiece remains stationary.

2. The binocular system of claim 1, further comprising an eye cup connected to each eyepiece and configured to form a substantial seal generally around a user's eye to restrict leakage of light.

3. The binocular system of claim 1, wherein each camera includes an objective lens that includes a diamond coating and/or a diamond-like carbon coating on an exterior surface region of the objective lens.

4. The binocular system of claim 1, wherein the displays are capable of presenting alphanumeric characters and/or other symbols with a single display as both displays present video images, such that the other information is only seen with one eye when the video images are viewed by a pair of eyes.

5. The binocular system of claim 4, wherein the alphanumeric characters are automatically flipped for presentation in a right-side up orientation to a user when the binocular system is turned upside down.

6. The binocular system of claim 1, further comprising a controller programmed to process image data in the video signals and to control presentation of video images by the displays based on the processed image data, wherein the controller is programmed to process the image data to perform facial recognition, scintillation mitigation, nonuniform correction, intent determination, or any combination thereof.

7. The binocular system of claim 1, further comprising a controller programmed to implement an electronic zoom of presented video images.

8. The binocular system of claim 7, wherein the controller is programmed to implement a stepped zoom in response to user input.

9. The binocular system of claim 7, wherein the controller is programmed to implement a smooth zoom in response to user input.

10. The binocular system of claim 1, wherein a relative intensity of left video images compared to right video images is adjustable by a user.

11. The binocular system of claim 1, further comprising a controller operatively connected to the displays and programmed to drive presentation of left video images and right video images formed using a different palette for each display.

12. The binocular system of claim 11, wherein the controller is programmed to drive presentation of monochromatic video images by one or both of the displays and video images including one or more colors absent from the monochromatic video images by the other display.

13. The binocular system of claim 12, wherein the video images including one or more colors are substantially monochromatic.

14. The binocular system of claim 11, wherein the controller is programmed to color-code regions in video images presented by one of the displays while the other display presents video images that are not color-coded.

15. The binocular system of claim 11, wherein the controller is programmed to drive presentation of monochromatic video images having inverse polarity relative to one another.

16. The binocular system of claim 1, further comprising head-mounting structure configured to permit the binocular system to be mounted on a user's head.

17. The binocular system of claim 1, further comprising a communication port configured to permit a dual-channel video signal representing the left and right video signals to be outputted by the binocular system.

18. The binocular system of claim 1, further comprising a controller programmed (a) to determine a distance from the system to an object represented in the video images based on processing the left and right video signals, and (b) to drive presentation by at least one of the displays of an indication of the distance.

19. The binocular system of claim 1, further comprising a controller programmed to drive presentation of alphanumeric characters and/or other symbols with a positional offset in left video images relative to right video images.

20. The binocular system of claim 1, wherein the system is sealed to restrict water entry, to permit submersion in water without damaging the cameras or displays.

\* \* \* \* \*